(12) United States Patent
Cameron et al.

(10) Patent No.: US 9,666,227 B2
(45) Date of Patent: May 30, 2017

(54) SOUNDTRACK FOR ELECTRONIC TEXT

(75) Inventors: Paul Charles Cameron, Auckland (NZ); Mark Steven Cameron, Hong Kong (CN); Rui Zhang, Auckland (NZ); Andrew Russell Davenport, Auckland (NZ); Paul Anthony McGrath, Auckland (NZ)

(73) Assignee: Booktrack Holdings Limited, Takapuna, Auckland (NZ)

( * ) Notice: Subject to any disclaimer, the term of this patent is extended or adjusted under 35 U.S.C. 154(b) by 0 days.

(21) Appl. No.: 14/234,555

(22) PCT Filed: Jul. 26, 2012

(86) PCT No.: PCT/NZ2012/000129
§ 371 (c)(1),
(2), (4) Date: Jan. 23, 2014

(87) PCT Pub. No.: WO2013/015694
PCT Pub. Date: Jan. 31, 2013

(65) Prior Publication Data
US 2014/0156046 A1 Jun. 5, 2014

Related U.S. Application Data

(60) Provisional application No. 61/511,659, filed on Jul. 26, 2011.

(51) Int. Cl.
*G06F 17/00* (2006.01)
*G11B 20/10* (2006.01)
(Continued)

(52) U.S. Cl.
CPC ...... *G11B 20/10527* (2013.01); *G06F 3/0483* (2013.01); *G06F 3/165* (2013.01);
(Continued)

(58) Field of Classification Search
CPC .... G11B 27/005; G09B 17/04; G09B 17/006; G09B 5/04; G06F 3/165; G06F 3/167; G06F 3/0483
See application file for complete search history.

(56) References Cited

U.S. PATENT DOCUMENTS 6,195,640 B1  2/2001  Mullaly et al.
2002/0054073 A1  5/2002  Yuen
(Continued)

FOREIGN PATENT DOCUMENTS

CA    2199245 A    3/1996
CN    2653597 Y    11/2004
(Continued)

OTHER PUBLICATIONS

"International Application Serial No. PCT/NZ2012/000129. International Preliminary Report of Patentability mailed Sep. 23, 2013", 8 pgs.
(Continued)

*Primary Examiner* — Joseph Saunders, Jr.
(74) *Attorney, Agent, or Firm* — Schwegman Lundberg & Woessner, P.A.

(57) ABSTRACT

A soundtrack creation method and user playback system for soundtracks synchronized to electronic text. Synchronization is achieved by maintaining a reading speed variable indicative of the user's reading speed. The system provides for multiple channels of audio to enable concurrent playback of two or more partially or entirely overlapping audio regions so as to create an audio output having, for example, sound effects, ambience, music or other audio features that are triggered to playback at specific portions in the electronic text to enhance the reading experience.

42 Claims, 19 Drawing Sheets

(51) Int. Cl.

| | | |
|---|---|---|
| *G11B 27/10* | (2006.01) | |
| *G06F 3/16* | (2006.01) | |
| *G10L 21/10* | (2013.01) | |
| *G06F 3/0483* | (2013.01) | |
| *G11B 27/00* | (2006.01) | |
| *G11B 27/11* | (2006.01) | |
| *G09B 5/06* | (2006.01) | |

(52) U.S. Cl.
CPC ............... *G06F 3/167* (2013.01); *G09B 5/06* (2013.01); *G09B 5/065* (2013.01); *G10L 21/10* (2013.01); *G11B 27/005* (2013.01); *G11B 27/10* (2013.01); *G11B 27/11* (2013.01)

(56) References Cited

U.S. PATENT DOCUMENTS

| | | |
|---|---|---|
| 2003/0043196 A1 | 3/2003 | Gibson |
| 2006/0075354 A1 | 4/2006 | Harpel |
| 2007/0183753 A1 | 8/2007 | Kanno |
| 2008/0005656 A1 | 1/2008 | Pang et al. |
| 2008/0140397 A1 | 6/2008 | Millman et al. |
| 2008/0140413 A1 | 6/2008 | Millman et al. |
| 2008/0141126 A1 | 6/2008 | Johnson et al. |
| 2008/0319755 A1 | 12/2008 | Nishiike et al. |
| 2009/0191531 A1 | 7/2009 | Saccocci et al. |
| 2010/0050064 A1 | 2/2010 | Liu et al. |
| 2010/0149933 A1 | 6/2010 | Cervera Navas |
| 2010/0153889 A1 | 6/2010 | Krause |
| 2010/0324895 A1 | 12/2010 | Kurzweil et al. |
| 2011/0050594 A1 | 3/2011 | Kim et al. |
| 2011/0112671 A1 | 5/2011 | Weinstein |
| 2011/0195388 A1* | 8/2011 | Henshall et al. ............. 434/317 |
| 2012/0001923 A1 | 1/2012 | Weinzimmer et al. |
| 2012/0036429 A1 | 2/2012 | Ajima |
| 2012/0054672 A1* | 3/2012 | McDowell ................... 715/784 |
| 2012/0084373 A1 | 4/2012 | Chen et al. |
| 2014/0142954 A1 | 5/2014 | Cameron et al. |
| 2014/0143642 A1 | 5/2014 | Cameron et al. |

FOREIGN PATENT DOCUMENTS

| | | |
|---|---|---|
| JP | 2004-192560 A | 7/2004 |
| WO | WO-0111588 | 2/2001 |
| WO | WO-02/17040 A2 | 2/2002 |
| WO | WO-03/093925 A2 | 11/2003 |
| WO | WO-2004/006209 A1 | 1/2004 |
| WO | WO-2006/100645 A2 | 9/2006 |
| WO | WO-2009/024626 A1 | 2/2009 |
| WO | WO-2010/002275 A2 | 1/2010 |
| WO | WO-2011/060106 A1 | 5/2011 |
| WO | WO-2011/073572 A1 | 6/2011 |
| WO | WO-2012/006256 A2 | 1/2012 |
| WO | WO-2013/015694 A1 | 1/2013 |

OTHER PUBLICATIONS

"International Application Serial No. PCT/NZ2012/000129. Response filed Aug. 22, 2013 to Written Opinion mailed Jul. 9, 2013", 37 pgs.

"International Application Serial No. PCT/NZ2012/000129. Written Opinion mailed Jul. 9, 2013", 4 pgs.

"International Application Serial No. PCT/NZ2012/000129. Written Opinion mailed Sep. 27, 2012", 7 pgs.

"Chinese Application No. 201280043267.8, Notification of First Office Action mailed Sep. 25, 2015 with English translation", (Sep. 25, 2015), 18 pgs.

"U.S. Appl. No. 14/163,225, Non Final Office Action mailed Apr. 8, 2016", 16 pgs.

"U.S. Appl. No. 14/166,436, Non Final Office Action mailed Apr. 7, 2016", 19 pgs.

"U.S. Appl. No. 14/163,225, Notice of Allowance mailed Nov. 22, 2016", 5 pgs.

"U.S. Appl. No. 14/163,225, Response filed Oct. 10, 2016 to Non Final Office Action mailed Apr. 8, 2016", 12 pgs.

"U.S. Appl. No. 14/166,436, Notice of Allowance mailed Nov. 21, 2016", 7 pgs.

"U.S. Appl. No. 14/166,436, Preliminary Amendment filed Jan. 28, 2014", 9 pgs.

"U.S. Appl. No. 14/166,436, Response filed Oct. 7, 2016 to Non Final Office Action mailed Apr. 7, 2016", 15 pgs.

"Chinese Application No. 201280043267.8, Notice of Allowance issued Jul. 4, 2016", (Jul. 4, 2016), 2 pgs.

"Chinese Application No. 201280043267.8, Response filed Apr. 11, 2016 to Chinese Office Action mailed Sep. 25, 2015", (Apr. 11, 2016), 40 pgs.

"European Application No. 12817871.2, Extended European Search Report mailed May 25, 2016", (May 25, 2016), 18 pgs.

* cited by examiner

  THE ADVENTURES OF SHERLOCK HOLMES 

Holmes and I rushed out and round the angle of the house, with Toller hurrying behind us. There was the huge famished brute, its black muzzle buried in Rucastle's throat, while he writhed and screamed upon the ground. Running up, I blew its brains out, and it fell over with its keen white teeth still meeting in the great creases of his neck. With much labour we separated them and carried him, living but horribly mangled, into the house. We laid him upon the drawing-room sofa, and having dispatched the sobered Toller to bear the news to his wife, I did what I could to relieve his pain. We were all assembled round him when the door opened, and a tall, gaunt woman entered the room.

"Mrs. Toller!" cried Miss Hunter.

"Yes, miss. Mr. Rucastle let me out when he came back before he went up to you. Ah, miss, it is a pity you didn't let me know what you were planning, for I would have told you that your pains were wasted."

"Ha!" said Holmes, looking keenly at her. "It is clear that Mrs. Toller knows more about this matter than anyone else."

"Yes, sir, I do, and I am ready enough to tell what I know."

"Then, pray, sit down, and let us hear it for there are several points on which I must confess that I am still in the dark."

"I will soon make it clear to you," said she; "and I'd have done so before now if I could ha' got out from the cellar. If there's police-court business over this, you'll remember that I was the one that stood your friend, and that I was Miss 510 —— Alice's friend too.

"She was never happy at home, Miss Alice wasn't, from the time that her father married again. She was slighted like and had no say in anything, but it never really became bad for her until after she met Mr. Fowler at a friend's house. As well as I could learn, Miss Alice had rights of her own by will, but she was so quiet and patient, she was, that she never said a word about them but just left everything in Mr. Rucastle's hands. He knew he was safe with her; but when

  308  

FIGURE 16

  THE ADVENTURES OF SHERLOCK HOLMES 

there was a chance of a husband coming forward, who would ask for all that the law would give him, then her father thought it time to put a stop on it. He wanted her to sign a paper, so that whether she married or not, he could use her money. When she wouldn't do it, he kept on worrying her until she got brain-fever, and for six weeks was at death's door. Then she got better at last, all worn to a shadow, and with her beautiful hair cut off; but that didn't make no change in her young man, and he stuck to her as true as man could be." — 512

"Ah," said Holmes, "I think that what you have been good enough to tell us makes the matter fairly clear, and that I can deduce all that remains. Mr. Rucastle then, I presume, took to this system of imprisonment?"

"Yes, sir."

"And brought Miss Hunter down from London in order to get rid of the disagreeable persistence of Mr. Fowler."

"That was it, sir."

"But Mr. Fowler being a persevering man, as a good seaman should be, blockaded the house, and having met you succeeded by certain arguments, metallic or otherwise, in convincing you that your interests were the same as his."

"Mr. Fowler was a very kind-spoken, free-handed gentleman," said Mrs. Toller serenely.

"And in this way he managed that your good man should have no want of drink, and that a ladder should be ready at the moment when your master had gone out."

"You have it, sir, just as it happened."

"I am sure we owe you an apology, Mrs. Toller," said Holmes, "for you have certainly cleared up everything which puzzled us. And here comes the country surgeon and Mrs. Rucastle, so I think, Watson, that we had best escort Miss

  309  

FIGURE 17

  THE ADVENTURES OF SHERLOCK HOLMES 

there was a chance of a husband coming forward, who would ask for all that the law would give him, then her father thought it time to put a stop on it. He wanted her to sign a paper, so that whether she married or not, he could use her money. When she wouldn't do it, he kept on worrying her until she got brain-fever, and for six weeks was at death's door. Then she got better at last, all worn to a shadow, and with her beautiful hair cut off; but that didn't make no change in her young man, and he stuck to her as true as man could be."

514

"Ah," said Holmes, "I think that what you have been good enough to tell us makes the matter fairly clear, and that I can deduce all that remains. Mr. Rucastle then, I presume, took to this system of imprisonment?"

"Yes, sir."

"And brought Miss Hunter down from London in order to get rid of the disagreeable persistence of Mr. Fowler."

"That was it, sir."

"But Mr. Fowler being a persevering man, as a good seaman should be, blockaded the house, and having met you succeeded by certain arguments, metallic or otherwise, in convincing you that your interests were the same as his."

"Mr. Fowler was a very kind-spoken, free-handed gentleman," said Mrs. Toller serenely.

"And in this way he managed that your good man should have no want of drink, and that a ladder should be ready at the moment when your master had gone out."

"You have it, sir, just as it happened."

"I am sure we owe you an apology, Mrs. Toller," said Holmes, "for you have certainly cleared up everything which puzzled us. And here comes the country surgeon and Mrs. Rucastle, so I think, Watson, that we had best escort Miss

  309  

FIGURE 18

  THE ADVENTURES OF SHERLOCK HOLMES 

there was a chance of a husband coming forward, who would ask for all that the law would give him, then her father thought it time to put a stop on it. He wanted her to sign a paper, so that whether she married or not, he could use her money. When she wouldn't do it, he kept on worrying her until she got brain-fever, and for six weeks was at death's door. Then she got better at last, all worn to a shadow, and with her beautiful hair cut off; but that didn't make no change in her young man, and he stuck to her as true as man could be."

"Ah," said Holmes, "I think that what you have been good enough to tell us makes the matter fairly clear, and that I can deduce all that remains. Mr. Rucastle then, I presume, took to this system of imprisonment?"

"Yes, sir."

"And brought Miss Hunter down from London in order to get rid of the disagreeable persistence of Mr. Fowler."

"That was it, sir."

"But Mr. Fowler being a persevering man, as a good seaman should be blockaded the house, and havin metallic or otherwise, in convinc his."

"Mr. Fowler was a very kind-spo serenely.

"And in this way he managed t drink, and that a ladder should b gone out."

"You have it, sir, just as it happen

"I am sure we owe you an apol certainly cleared up everything w surgeon and Mrs. Rucastle, so I th

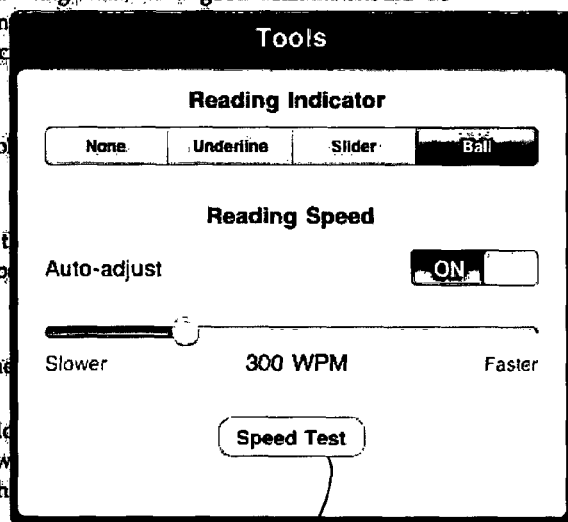

  309  

FIGURE 19

    THE ADVENTURES OF SHERLOCK HOLMES   

there was a chance of a husband coming forward, who would ask for all that the law would give him, then her father thought it time to put a stop on it. He wanted her to sign a paper, so that whether she married or not, he could use her money. When she wouldn't do it, he kept on worrying her until she got brain-fever, and for six weeks was at death's door. Then she got better at last, all worn to a shadow, and with her beautiful hair cut off; but that didn't make no change in her young man, and he stuck to her as true as man could be."

"Ah," said Holmes, "I think that what you have been good enough to tell us makes the matter fairly clear, and that I can deduce all that remains. Mr. Rucastle then, I presume, took to this system of imprisonment?"

"Yes, sir."

"And brought Miss Hunter down from London in order to get rid of the disagreeable persistence of Mr. Fowler."

"That was it, sir."

"But Mr. Fowler being a persevering man, as a good seaman should be, blockaded the house, and having met you succeeded by certain arguments, metallic or otherwise, in convincing you that your interests were the same as his."

530 ⟶

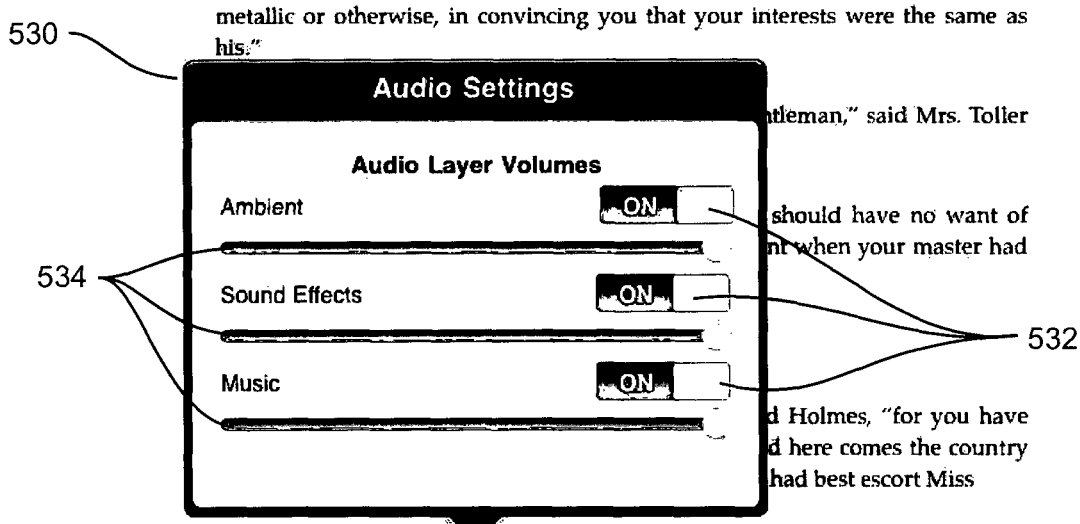

tleman," said Mrs. Toller
should have no want of
nt when your master had

⟵ 532 d Holmes, "for you have
d here comes the country
had best escort Miss

    309      

FIGURE 20

 

HANSEL AND GRETEL EDIT oven. Then Gretel gave her a push that drove her far into it, and shut the iron door, and fastened the bolt. Oh! The evil witch was trapped inside the oven, but Gretel ran away, and the evil witch met with a most terrible end.

Gretel, however, ran like lightning to Hansel, opened his stable door, and cried: 'Hansel, we are saved! The old witch is dead!' Then Hansel sprang like a bird from its cage when the door is opened. How they did rejoice and embrace each other, and dance about and hug each other!

And as they had no longer any need to fear her, they went into the witch's house, and in every corner there stood chests full of pearls and jewels. 'These are far better than pebbles!' said Hansel, and filled his pockets with whatever could be got in, and Gretel said: 'I, too, will take something home with me,' and filled her pinafore full too.
'But now we must be off,' said Hansel, 'that we may get out of the witch's forest.'

When they had walked for two hours, they came to a great stretch of water. 'We cannot cross,' said Hansel, 'I see no foot-plank, and no bridge.' 'And there is also no ferry,' answered Gretel, 'but a white duck is swimming there: if I ask her, she will help us over.' Then she cried:

540

'Little duck, little duck, don't you see,

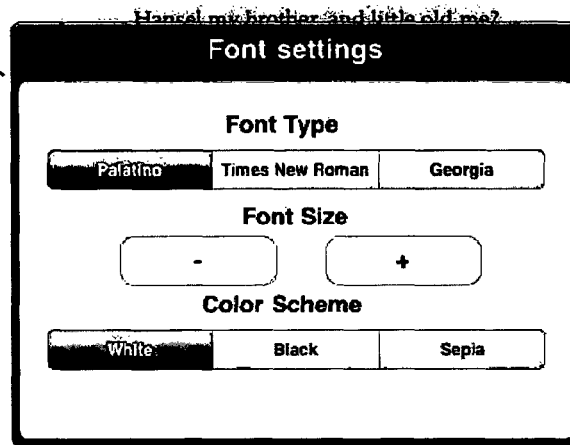

himself on its back, and told his
will be too heavy for the little duck;
The good little duck did so, and
walked for a short time, the forest
, and at length they saw from afar
rushed into the parlor, and threw

  7  

FIGURE 21

SOUNDTRACK FOR ELECTRONIC TEXT

RELATED APPLICATIONS

This application is a U.S. National Stage Filing under 35 U.S.C. §371 of International Application No. PCT/NZ2012/000129, filed on Jul. 26, 2012, and published as WO 2013/015694 A1 on Jan. 31, 2013, which claims priority to U.S. Application Ser. No. 61/511,659, filed Jul. 26, 2011, which applications and publication are incorporated herein by reference in their entirety.

FIELD OF THE INVENTION

The present invention relates to a method and system for making and playing soundtracks for electronic text. In particular, the soundtracks are configured for playback that is synchronized with the reading speed of the user.

BACKGROUND TO THE INVENTION

Books are now commonly provided in various electronic text formats for reading on portable electronic devices with a display. For example, most books now being published are provided as e-books, either exclusively or in parallel with traditional hardcopy printed versions, for reading via an assortment of various e-Reader devices. Various types of e-Reader devices are available, including portable stand-alone e-Reader devices or e-Reader software applications that may be loaded on consumer portable electronic devices or desktop computers.

To enhance the reading experience, various systems have been proposed in which audio soundtracks may be played while the user reads an e-book. Some of the systems propose soundtracks that are customised according to the content of the e-book. Some of the systems synchronise the playback of the soundtrack with the user's reading speed by calculating the reading speed at each page turn and then reproducing the remaining soundtrack for playback at each page turn with a modified duration that is based on the calculated reading speed. Other systems provide a soundtrack for each page of the e-book and then modify the duration of the soundtracks based on the user's calculated reading speed.

The above such systems suffer various drawbacks, including deficiencies in the accuracy of the synchronization, playback processing inefficiencies, and lack of flexibility in adapting to various user interactions with the e-book, such as the altering of font size display settings.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved method and system for making and playing soundtracks that are configured for synchronized playback with the reading of a corresponding electronic text, or to at least provide the public with a useful choice.

SUMMARY OF THE INVENTION

In a first aspect, the invention broadly consists in a method for controlling the commencement of playback of a soundtrack for an electronic text, the soundtrack comprising multiple audio regions configured for playback during corresponding text regions of the electronic text, each audio region being defined by audio data comprising: an audio track for playback in the audio region; a start text position in the electronic text corresponding to where the playback of the audio track is to begin; and a stop text position in the electronic text corresponding to where playback of the audio track is to cease, comprising: receiving an arbitrary commencement text position within the electronic text at which the soundtrack is to commence playback; processing the audio data of the soundtrack to identify any one or more active audio regions within the soundtrack at that commencement text position; calculating respective offset cue times for the audio tracks of any active audio regions based on the respective offset positions of the commencement text position relative to the start text positions of the audio regions and a user reading speed variable indicative of the user's reading speed; and initiating playback of the audio tracks of any active audio regions at their respective calculated offset cue times to commence soundtrack playback.

In one form, the electronic text may have a designated text index based on the number of words or characters in the electronic text and the start text position, stop text position, and commencement text position are represented by a start index value, a stop index value, and a commencement index value, respectively.

In one form, initiating playback may comprise initiating playback of all (if there are more than one) active audio regions at the commencement text position simultaneously at their respective offset cue times.

In one form, receiving a commencement text position comprises sensing a user manual selection input of the commencement text position within the electronic text displayed on a display screen. By way of example, receiving a commencement text position may comprise displaying the electronic text on a touch screen display and detecting a user manual selection input in the form of a touch input on the touch screen display in the vicinity of the word or character corresponding to the commencement text position.

In one form, processing the audio data may comprise searching the audio data for audio regions in which the commencement text position falls between the start text position and stop text position of the audio regions.

In a second aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a reading position module configured to generate a reading position counter corresponding to the estimated current text position in the electronic text that the user is currently reading, the reading position counter incrementing at a rate based at least partly on a configurable user reading speed variable representing the user's reading speed; and a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start text position in the electronic text corresponding to where the playback of the audio region is to begin; and a stop text position in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text, and wherein the soundtrack playback module is further operable to commence playback of the soundtrack at any arbitrarily user-selected commencement text position within the electronic text by triggering each audio track of any one or more active audio regions at the selected commencement text position to playback at a respective offset cue time from the start of the audio track that is calculated based on the respective offset position of the commencement text position relative to the start text position of the audio region and the user reading speed variable.

In a third aspect, the invention may broadly consist in a method for displaying electronic text and synchronizing the playback of a soundtrack for the electronic text, the soundtrack comprising multiple audio regions configured for playback during corresponding text regions of the electronic text, each audio region being defined by audio data comprising: an audio track for playback in the audio region, a start text position in the electronic text corresponding to where the playback of the audio track is to begin; and a stop text position in the electronic text corresponding to where playback of the audio track is to cease, and at least some audio regions further each being defined by playback effect data that defines one or more controllable audio playback effect settings that are to be varied across the audio region or a portion of the audio region based on the user's real-time text position, comprising: displaying at least a portion of the electronic text on a display; maintaining a reading position counter corresponding to the estimated text position in the electronic text that the user is currently reading, the counter incrementing at a rate based on a configurable user reading speed variable representing the user's reading speed; controlling playback of the audio regions of the soundtrack over an audio output system based on the audio data and reading position counter to synchronise playback of the audio regions with the user's estimated reading position; and controlling audio playback effect settings of the audio output system in real-time based on the reading position counter for any audio regions having pre-defined playback effect data such that the audio playback effect settings are varied in real-time based on the user's real-time text position.

In one form, the audio output system may comprise a plurality of channels such that any overlapping audio regions can playback concurrently on separate channels, and wherein the method comprises controlling independently the playback effect settings of each channel based on any pre-defined audio playback effect data associated with the overlapping audio regions.

In one form, the pre-configured playback effect data may be defined by a programmable function the output of which represents a playback effect setting that is dependent on a variable corresponding to the reading position counter or a counter that is a product or function of the reading position counter.

In another form, the pre-configured playback effect data associated with an audio region may be in the form of a look-up table which defines a discrete playback effect setting for a series of discrete text positions extending across at least a portion of the audio region.

In one form, the pre-configured playback effect data associated with an audio region may be represented in the form of one or more envelopes that each define a playback effect setting that is variable across at least a portion of the audio region, and where the shape of each envelope across the audio region or portion of the audio region defines how its associated playback effect setting is varied across the audio region or portion of the audio region. In one example, the pre-configured playback effect data may comprise a volume envelope that defines a variable volume setting to be applied during playback of the audio region, and controlling audio playback effect settings of the audio output system comprises updating a volume setting of the audio output system in real-time to match the volume envelope based on the user's real-time text position within the audio region. Additionally or alternatively, the pre-configured playback effect data may comprise a panning envelope that defines a variable balance setting to be applied during playback of the audio region, and controlling the audio playback effect settings of the audio output system comprises updating a balance setting of the audio output system in real-time to match the panning envelope based on the user's real-time text position within the audio region.

By way of example only, the pre-configured playback effect data may define any one or more of the following controllable audio playback effect settings: volume, balance, equalization, reverberation, distortion, and phase-shifting.

In a fourth aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear and which has controllable audio playback effect settings for applying audio playback effects to the audio output; an electronic text display module configured to process electronic text data representing the electronic text and control display of the electronic text on the display in response to user input from the user interface; a reading position module configured to generate a reading position counter representing the estimated current text position in the electronic text that the user is currently reading, the reading position counter incrementing at a rate based at least partly on a configurable user reading speed variable representing the user's reading speed; and a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start text position in the electronic text corresponding to where the playback of the audio region is to begin; and a stop text position in the electronic text corresponding to where the playback of the audio region is to cease; and at least some of the audio regions further each being defined by playback effect data that defines one or more controllable audio playback effect settings that are to be varied across an audio region or a portion of the audio region based on the user's real-time text position, and wherein the soundtrack playback module is configured to coordinate playback of the audio regions based on the reading position counter to synchronize playback of the audio regions of the soundtrack with the user's reading of the electronic text, and the soundtrack playback module being further configured to control the audio playback effect settings of the audio output system in real-time based on the reading position counter for any audio regions having associated playback effect data such that the audio playback effect settings for each such audio region are varied in real-time based on the user's real-time text position.

In a fifth aspect, the invention may broadly consist in a method of updating a reading speed variable representing the reading speed of a user reading electronic text, the reading speed variable being used for synchronizing the playback of a soundtrack for the electronic text, comprising: displaying at least a portion of the electronic text on an electronic display, the display having an associated user input to enable user interaction with the display; sensing and tracking movement of the user input relative to the displayed electronic text, the movement representing the user's reading position on the display as they trace their reading of the electronic text via the user input; generating data indicative of the quantity of text read and time taken for the movement; calculating a measurement of reading speed based on the quantity of text read during the movement and the time taken for the movement; and updating the reading speed variable based on the calculated measurement of reading speed.

In one form, sensing and tracking movement of a user input may comprise sensing a start text position in the electronic text at which the user initiates the movement and an end text position in the electronic text at which the user ceases the movement, and generating data indicative of the quantity of the text traversed during the movement comprises determining the number of words or characters between the detected start and end text positions associated with the movement.

In one form, generating data indicative of the time taken for the movement may comprises initiating a timer upon initiation of the movement at the start text position and halting the timer at the end of the movement at the end text position, the output of the timer being indicative of the time taken for the movement.

In one form, the electronic display may be a touch screen display having a user input in the form of touch input upon the surface of the display which generates representative touch signals, and wherein the start text position in the electronic text is detected at initiation of the movement upon sensing user contact with the surface of the display and the end text position is sensed at the position in the electronic text where the user disengages their contact from the surface of the display.

In one form, sensing and tracking movement of a user input may comprise tracking the user input as it moves substantially horizontally relative to the displayed electronic text word-by-word. Additionally or alternatively, sensing and tracking movement of the user input may comprise tracking the user input as it moves substantially vertically relative to the displayed electronic text line-by-line.

In one form, calculating a measurement of reading speed may comprise generating a measurement of reading speed at the end of the movement based on the total quantity of text read and total time taken. In another form, calculating a measurement of reading speed may comprise continuously or periodically generating a measurement of reading speed in real-time based on quantity of text read since the initiation of the movement and the time elapsed since the initiation of the movement; and continuously or periodically updating the reading speed variable.

In a sixth aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a reading position module configured to generate a reading position counter corresponding to the estimated current text position in the electronic text that the user is currently reading, the reading position counter incrementing at a rate based at least partly on a configurable user reading speed variable representing the user's reading speed; a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start text position in the electronic text corresponding to where the playback of the audio region is to begin; and a stop text position in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text; and wherein the system further comprises a reading speed adjustment module that is configured to sense and track movement of a user input relative to the displayed electronic text for a tracking period initiated by the user and which calculates and updates the user reading speed variable based on the quantity of text read during the movement and the time taken for the movement, the movement representing the user's reading position on the display as they trace their reading of the electronic text via the user input.

In a seventh aspect, the invention broadly consists in a method of updating a reading speed variable representing the reading speed of a user reading electronic text, the reading speed variable being used for synchronizing the playback of a soundtrack for the electronic text, comprising: displaying at least a portion of the electronic text on a display; detecting a first user input indicative of a first reading text position corresponding to the user's arbitrary reading text position in the electronic text at the time of the first input, and generating data indicative of the first reading text position; detecting a second subsequent user input indicative of a second reading text position corresponding to the user's arbitrary reading position in the electronic text at the time of the second input, and generating data indicative of the second reading text position; calculating the quantity of text read between the first and second reading text positions based on the generated data; calculating an estimate of the user's reading speed based on the calculated quantity of text read and the time period between the first and second user inputs; and updating the reading speed variable based on the calculated estimate of the user's reading speed.

The term 'arbitrary' in this context is intended to mean that the user may indicate their current reading position at any desired text position in the electronic text, and at any time during reading of the electronic text.

In one form, the electronic text may be indexed based on the number of words or characters in the electronic text, and the data indicative of the first reading text position comprises a first index value corresponding to the index value at the first reading text position, and the data indicative of the second reading text position comprises a second index value corresponding to the index value at the second reading text position, and wherein calculating the quantity of text read comprises calculating the absolute difference between the first and second index values.

In one form, the method may further comprise generating a first time stamp and a second time stamp corresponding to the respective times of the first user input and second user input, and calculating the time period between the first and second user inputs based on absolute difference between the first and second time stamps. In another form, the method may further comprise starting a timer on detection of the first user input and stopping the timer on detection of the second user input, and the output of the timer representing the time period between the first and second user inputs.

In one form, the display may be a touch screen display, and detecting the first and second user inputs comprises sensing user selections of the arbitrary text positions in the electronic text by sensing a user touch input on the surface of the touch screen display at locations corresponding to the arbitrary text positions. In another form, detecting the first and second user inputs may comprise detecting user selection of the arbitrary text positions in the electronic text by sensing user activation via a user input device of a pointer on the display situated at the location corresponding to the arbitrary text positions.

In one form, the method may further comprise calculating a new estimate of the user's reading speed for each new subsequent user input indicative of the user's arbitrary reading text position in the electronic text, each new estimate of the user's reading speed being calculated based on the quantity of text and time period between the user input indicative of the newest arbitrary reading text position and the previous indicated arbitrary reading text position.

In one form, the method may comprise updating the user reading speed variable by applying an update algorithm for each new calculated estimate of the user's reading speed, the update algorithm comprising: calculating a new moving average of the reading speed variable based on a predetermined number of previous reading speed variables; calculating a difference value indicative of the percentage change between the new calculated estimate of the user's reading speed and the moving average; determining a probability weighting for the new calculated estimate of the user's reading speed based on the difference value and a probability density function; and calculating a new reading speed variable based on the new calculated estimate of the user's reading speed, the moving average, and the probability weighting.

In an eighth aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a reading position module configured to generate a reading position counter corresponding to the estimated current text position in the electronic text that the user is currently reading, the reading position counter incrementing at a rate based at least partly on a configurable user reading speed variable representing the user's reading speed; a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start text position in the electronic text corresponding to where the playback of the audio region is to begin; and a stop text position in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text; and the system further comprising a reading speed adjustment module that is configured to: detect a first user input indicative of a first reading text position corresponding to the user's arbitrary reading text position in the electronic text at the time of the first input, and generate data indicative of the first reading text position; detect a second subsequent user input indicative of a second reading text position corresponding to the user's arbitrary reading position in the electronic text at the time of the second input, and generate data indicative of a second reading text position; calculate the quantity of text read between the first and second reading text positions based on the generated data; calculate an estimate of the user's reading speed based on the calculated quantity of text read and time period between the first and second user inputs; and update the configurable user reading speed variable based on the calculated estimate of the user's reading speed.

In a ninth aspect, the invention broadly consists in a method of updating a reading speed variable representing the reading speed of a user reading electronic text, the reading speed variable being used for synchronizing the playback of a soundtrack for the electronic text, comprising: displaying at least a portion of the electronic text on a display; displaying a moving reading position indicator on the display which identifies the current text position that is estimated as being read based on an initial reading speed variable representing the user's estimated reading speed, the reading position indicator moving relative to the text at a rate based on the reading speed variable; providing a user adjustment interface that is operable to increase or decrease the reading speed variable; and updating the reading speed variable according to any user adjustment to thereby modify the rate of movement of the reading position indicator to match the updated reading speed variable, and wherein the user adjustment interface is operable simultaneously as the electronic text and moving reading position indicator are displayed such that the user can view in real-time the effect of any adjustment of the reading speed variable.

In one form, the user adjustment interface may be in the form of activatable increase and decrease inputs that are configured to respectively increase or decrease the reading speed variable by a predetermined value upon activation by a user. In another form, the user adjustment interface may be in the form of an operable dial or slider that is moveable to increase or decrease the reading speed variable to a user selected value within a scale of reading speed values defined between upper and lower limits.

In one form, the reading position indicator may be an inline indicator that is configured to traverse the lines of text word-by-word or character-by-character at a rate that is dependent on the reading speed variable. Additionally or alternatively, the reading position indicator may be a margin indicator that is configured to move down the margin of the display text line-by-line at a rate that is dependent on the reading speed variable.

In a tenth aspect, the invention broadly consists in a system for displaying electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a reading position module configured to generate a reading position counter corresponding to the estimated current text position in the electronic text that the user is currently reading, the reading position counter incrementing at a rate based at least partly on a configurable user reading speed variable representing the user's reading speed; a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start text position in the electronic text corresponding to where the playback of the audio region is to begin; and a stop text position in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text; and the system further comprising a reading speed adjustment module that is configured to: display a moving reading position indicator on the display which identifies the estimated current text position that is estimated as being read based on the reading position counter; provide a user adjustment interface that is operable to increase or decrease the configurable user reading speed variable; and update the user reading speed variable according to any user adjustment to thereby modify the rate of movement of the reading position indicator, and wherein the user adjustment interface is operable simultaneously as the electronic text and moving reading position indicator are displayed such that the user can view in real-time the effect of any adjustment of the user reading speed variable.

In another aspect, the invention may broadly consist in a method of making a soundtrack for synchronised playback with the reading of an electronic text comprising the steps of: designating a text index to the electronic text based on the number of words or characters in the electronic text; defining multiple audio regions for the soundtrack, each audio region being defined by configurable audio data and the audio data being configured by: selecting an audio track from a database for playback in the audio region; and designating a start index value representing the start text position in the electronic text corresponding to where the playback of the audio region is to begin and a stop index value representing the stop text position in the electronic text corresponding to where the playback of the audio region is to cease; and compiling the audio data associated with the audio regions into an output data file representing the soundtrack.

In some embodiments, the text index is based on the number of words in the electronic text. Each word in the electronic text may be designated a unique index value that represents its position in the text relative to the other words. By way of example, each word may have an index value that corresponds to its word number or word count in the electronic text. In these embodiments, the start and stop text positions represent start and stop words in the electronic text where the audio region is to begin and cease, respectively. In other embodiments, the text index may be based on the number of characters, and the index values may correspond to a character number or character count in the electronic text.

In some embodiments, the step of configuring the audio data for an audio region further comprises defining an audio type for the audio region from a list of audio types. By way of example, the types may comprise background music, ambient sounds, and sound effects.

In some embodiments, the step of configuring the audio data for an audio region further comprises defining a channel from a selection of channels over which the audio track of the audio region will playback. Preferably, the soundtrack comprises multiple channels such that two or more overlapping audio regions may playback concurrently.

In some embodiments, the step of compiling audio data into an output data file representing the soundtrack further comprises adding header data to the output data file comprising information indicative of electronic text to which the soundtrack corresponds and/or general soundtrack identification information.

In some embodiments, the step of compiling the audio data into the output data file representing the soundtrack further comprises adding electronic text data representing the electronic text into the output data file such that the output data file is a multimedia data file comprising both data representing the soundtrack and the corresponding electronic text.

In some embodiments, the audio data for each audio region comprises the audio track in the form of an actual audio track sound file for playback, i.e. in such embodiments the output data file of the soundtrack comprises all data required for soundtrack playback, including the audio files of the audio tracks. In other embodiments, the audio data for each audio region comprises a link (e.g. filepath or file address or location) to the actual audio track sound file for playback.

In another aspect, the invention may broadly consist in a system for displaying electronic text having a designated text index based on the number of words or characters in the electronic text and controlling playback of a soundtrack synchronized to the reading speed of a user comprising: a display configured to display the electronic text; a user interface configured to receive user input to control the system; an audio output system that is operable to generate audio output for the user to hear; an electronic text display module configured to process electronic text data representing the electronic text and control display of the electronic text on the display in response to user input from the user interface; a reading position module configured to generate a reading position counter representing an index value corresponding to the estimated current text position in the electronic text that the user is currently reading, the reading position counter incrementing at a rate based at least partly on a configurable user reading speed variable representing the user's reading speed; and a soundtrack playback module configured to process soundtrack data representing the soundtrack to control playback of the soundtrack over the audio output system, the soundtrack data defining multiple audio regions for the soundtrack, each audio region being defined by audio data comprising: an audio track for playback in the audio region; a start index value representing the start text position in the electronic text corresponding to where the playback of the audio region is to begin; and a stop index value representing the stop text position in the electronic text corresponding to where the playback of the audio region is to cease; and wherein the soundtrack playback module is configured to coordinate playback of the audio regions based on the reading position counter to synchronize playback of the audio regions of the soundtrack with the user's reading of the electronic text.

In some embodiments, the electronic text is indexed based on the number of words in the electronic text. For example, each word is designated an index value corresponding to its word number or word count in the electronic text. In such embodiments, the reading position counter represents the index value of the estimated current word being read. In other embodiments, the text indexing may be based on the number of characters, and the reading position counter represents the index value of the estimated current character being read.

In some embodiments, the user interface comprises a re-synchronization interface that is configured to receive user input representing a re-sync text position corresponding to the desired or actual text position in the electronic text to which re-synchronisation of the soundtrack playback should occur. By way of example, the user input may be in the form of a user identifying an actual word or character in the electronic text that is to be the re-sync text position. In one embodiment, the display comprises a touch-screen interface and the re-synchronization interface is configured to monitor touch-screen interaction for a user indicator input representing the actual word being read. In one example, the input indicator may be in the form of a double-tap or single-tap or pressing on the actual word or character corresponding to the desired re-sync text position. In another example, the input indicator may be in the form of the user dragging a reading position indicator ('inline' or 'margin') to the actual word or character corresponding to the desired re-sync text position. The re-synchronisation interface is configured to update or modify the reading position counter to match the index value corresponding to the word or character at the re-sync text position such that the soundtrack playback module halts and re-initialises playback of the soundtrack and any active audio regions at the re-sync text position.

The soundtrack playback module may also be configured to control concurrent playback of any two or more overlapping audio regions in the soundtrack over their respective channels.

In another aspect, the invention may broadly consist in a method for displaying electronic text having a designated text index based on the number of words or characters in the electronic text and synchronizing the playback of a soundtrack for the electronic text according to a user's reading speed comprising: displaying at least a portion of the electronic text on the display; maintaining a reading position counter representing an index value corresponding to the estimated current text position (word or character) in the electronic text that the user is currently reading; incrementing the reading position counter at a rate at least partly based on a configurable user reading speed variable corresponding to the user's estimated reading speed; and controlling playback of the soundtrack based on the reading position counter, the soundtrack being defined by multiple audio regions for the soundtrack, each audio region being defined by audio data comprising: an audio track for playback in the audio region; a start index value representing the start text position in the electronic text corresponding to where the playback of the audio track is to begin; and a stop index value representing the stop text position in the electronic text corresponding to where playback of the audio track is to cease.

In one form, controlling the playback of the soundtrack comprises initiating playback of an audio region when the reading position counter matches the start index value of that audio region, and ceasing playback of the audio region when the reading position counter matches the stop index value of that audio region. More preferably, the method comprises controlling playback of any two or more overlapping audio regions for concurrent playback.

In another aspect, the invention may broadly consist in a method of updating a reading speed variable representing an estimate of the reading speed of a user reading electronic text, the electronic text being indexed based on the number of words or characters in the electronic text, comprising: displaying at least a portion of the electronic text on a display; detecting each new user input indicative of a new reading text position corresponding to the user's arbitrary reading text position in the electronic text at the time of the new user input; calculating a new estimate of the user's reading speed for each new user input based on the length of text and time period between the newest reading text position and the previous indicated reading text position; and updating the reading speed variable by applying an update algorithm to each new calculated estimate of the user's reading speed.

Each of the aspects of the invention above may have any one or more of the features mentioned in the respect of the other aspects of the invention. In particular, it will be appreciated that the features mentioned above may be interchanged and combined in various forms, as will further be evident from the following description of example embodiments.

The phrase "text position" as used in this specification and claims, unless the context suggests otherwise, is intended to refer to a position or location within the electronic text such as typically a line or word or character of the electronic text or any other arbitrary selected position with the electronic text, and the position may be referenced or identified in any suitable manner appropriate to the electronic text, whether indirectly or directly, including but not limited to: an index value, numeric or otherwise, corresponding to the index position of a line, word or character in the electronic text for an electronic text that has been indexed, including a line number, word number of character number for example; or any other positional reference scheme for identifying locations within electronic text.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 3b shows a close up of the main toolbar indicated at A in FIG. 3a;

FIG. 16 shows a screenshot of a GUI of the user playback system displaying electronic text with a first type of in-line reading position indicator;

FIG. 17 shows the GUI of FIG. 16 but with a second type of in-line reading position indicator;

FIG. 18 shows the GUI of FIG. 16 but with a margin reading position indicator;

FIG. 19 shows a screenshot of the GUI of FIG. 16 with a tools menu interface activated;

FIG. 20 shows the GUI of FIG. 16 with an audio settings interface activated;

FIG. 21 shows the GUI of FIG. 16 with a font settings interface activated;

DETAILED DESCRIPTION OF PREFERRED EMBODIMENTS

1. Overview

Figure 1:
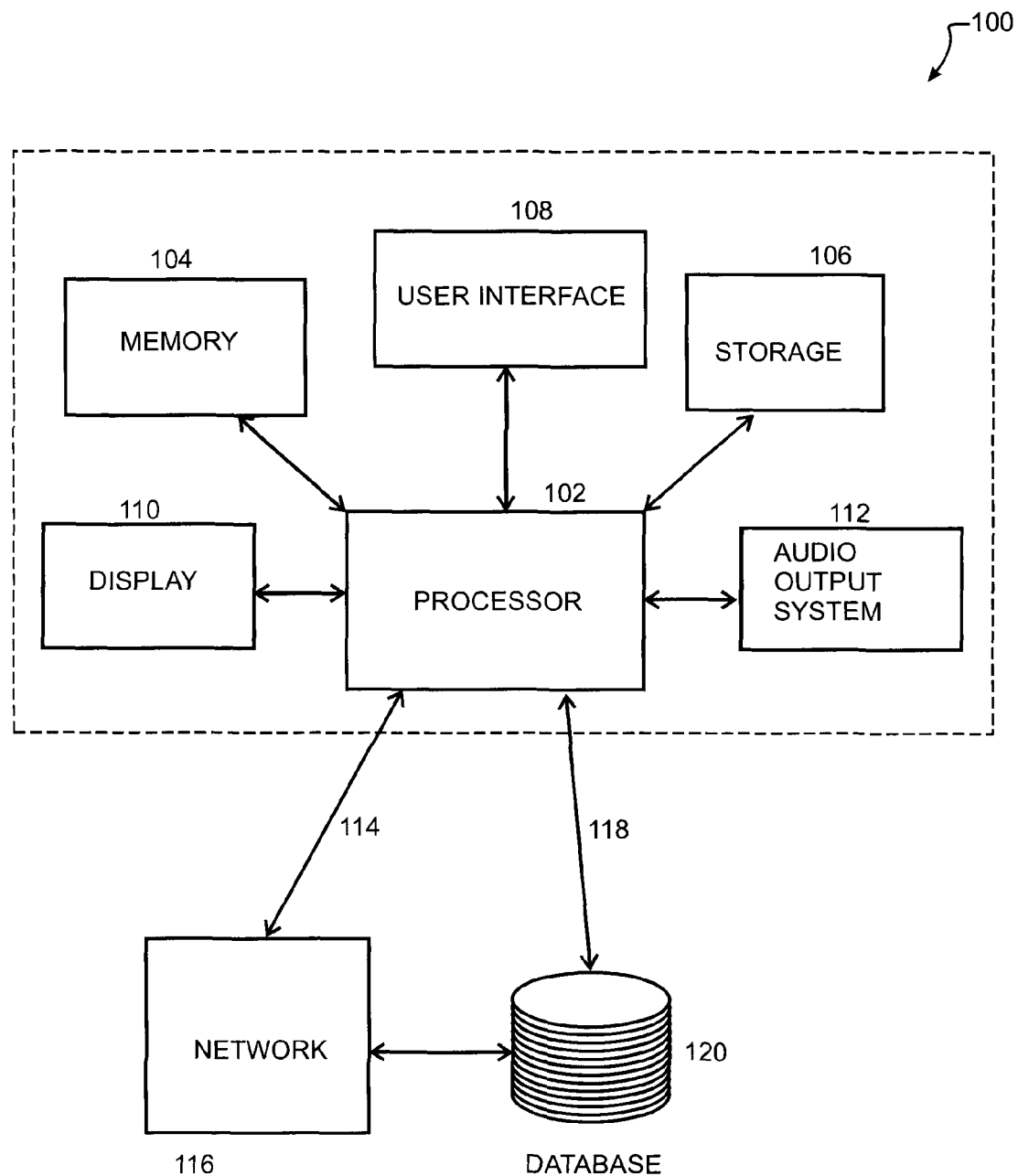
FIG. 1 shows a schematic block diagram of a soundtrack creation system in accordance with an embodiment of the invention.

The invention relates to a method and system for making and playing soundtracks for electronic text, such as electronic books (the e-books). The invention may be applied to electronic text in any format or file-type, including but not limited to those associated with the following file extensions: aeh, djvu, epub, fb2, html, xhtml, azw, lit, pre, mobi, exe, pdb, txt, pdb, pdf, ps, rgo, pdb, tr2, tr3, wol, rtf, doc, docx, asc, lit, wri, odt, text, pwi, rtx, sdw, strings, utf8, utf16, wp*, wpw, wri, wtx, asc, csv, lwp, dtp, indd, pmd, ppp, pub, fin, and any type of mark up language types, including but not limited to SGML, HTML, XHTML, HTML5, XML, and LaTex. The electronic text may comprise text alone, or may be provided in combination with imagery, whether static or moving (e.g. video or other animations).

The soundtrack is customised to the electronic text and in particular customized to the content of the electronic text to enhance the reading experience for a reader of the electronic text. The soundtrack may comprise audio tracks of different types and may be configured to play concurrently, sequentially, or both while the user is reading the electronic text. Playback of the soundtrack is synchronized with the reading speed of the user. By way of example, the electronic text may be a fiction or non-fiction book, and the soundtrack may comprise a combination of different audio types, including ambient noise, sound effects, and background music that may be configured to play back at a specific point or over specific portions of the electronic text in a synchronized manner as the user is reading those portions of the electronic text.

The soundtrack comprises multiple audio regions that are designated to playback during designated text portions of the electronic text. Each audio region comprises audio data defining the audio track to playback and audio properties defining the desired nature of the playback. The audio data specifies a start text position in the electronic text at which the audio region is to commence playback and a stop text position at which the audio region is to cease playback. The electronic text is designated a numerical text index based on the number words or characters in the electronic text, and the start and stop text positions are defined by corresponding start and stop index values respectively. In one embodiment, the indexing of the text is based on the number of words in the electronic text such that each word has a unique index value representing its position in the electronic text. The index values for each word may correspond to their word number or word count in the electronic text. In such embodiments, the audio regions playback between start and stop index values representing the selected start and stop words in the electronic text for that audio region.

When the user is reading the electronic text, a reading position counter or identifier is maintained which corresponds to text position in the electronic text at which the user is estimated as currently reading. The reading position counter increments or changes at a rate at least partially based on the user's reading speed. This reading position counter allows the playback of the audio regions of the soundtrack to be synchronized with the user's reading speed such that playback of an audio region is triggered when the reading position counter matches the start index value of the start word for the audio region, and likewise ceases when the reading position counter matches the stop index value of the stop word of the audio region.

The sound track comprises multiple audio regions and playback of two or more regions may partially or entirely overlap such that two or more audio regions can playback concurrently if desired. The soundtrack is provided with multiple channels for playback and overlapping audio regions are designated different channels in the set of available channels to allow for concurrent playback. This enables different audio tracks, such as sound effects, ambient noise, or background music to be concurrently played and mixed together to provide an overall soundtrack that enhances the user's reading experience for that particular electronic text.

A more detailed explanation of an embodiment of a system (soundtrack creation system) and method for producing a soundtrack for an electronic text, and a system (user playback system) and method for displaying the electronic text and controlling playback of the soundtrack will now be provided by way of example only.

2. A System and Method for Producing a Soundtrack

Soundtrack Creation System

In this embodiment, the soundtrack creation system is provided as an application program or software running on an electronic hardware system such as a personal computer although it will be appreciated that the creation system may be provided or implemented in any suitable form, whether in software, hardware, or a combination of these. This embodiment of the soundtrack creation system and method will be described with reference to FIGS. 1-14.

Referring to FIG. 1, an example of the hardware system 100 upon which the soundtrack creation system software may run as shown. The hardware system 100 includes a processor 102 for executing software or computer-readable instructions, memory 104 for data processing and execution of instructions, data storage 106 such as a hard disk drive for data storage, a user interface 108 to enable the user to interact with the hardware system and software, a display 110 for displaying graphical user interfaces (GUIs) of the soundtrack creation software, and an audio output system 112 for producing audio output over speakers or headphones. The hardware system 100 may also comprise external device interfaces and/or communication modules for establishing communication links 114 to external networks, such as the Internet or an extranet or intranet 116 or communication links 118 to external databases 120 such music libraries. It will be appreciated this hardware system may be provided in the form of a personal computer, whether desktop, laptop, notebook or any other electronic hardware platform or system.

Soundtrack Production Process

Figure 2:
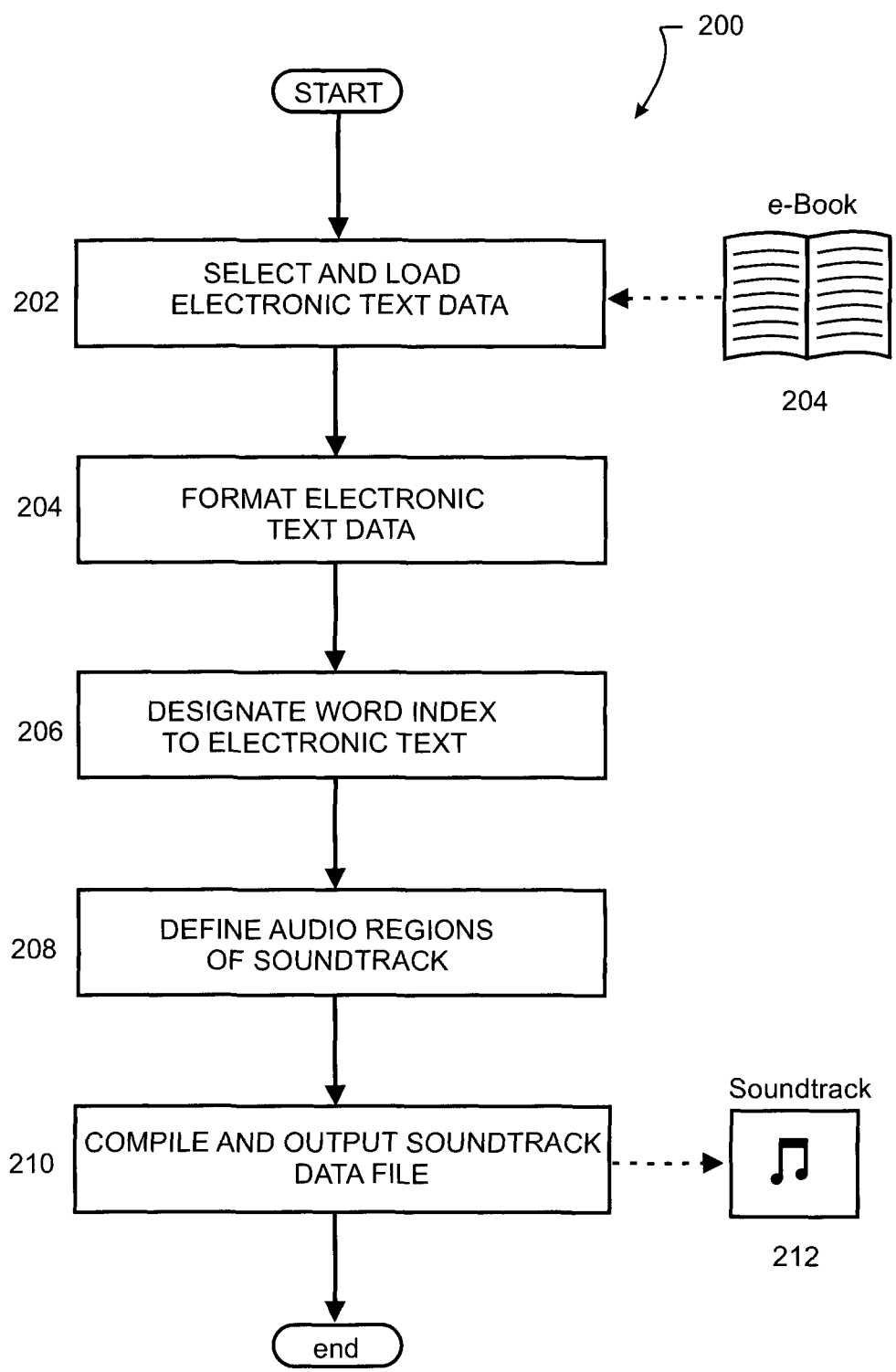
FIG. 2 shows a flow diagram of a soundtrack production method in accordance with an embodiment of the invention.
Figure 3A:
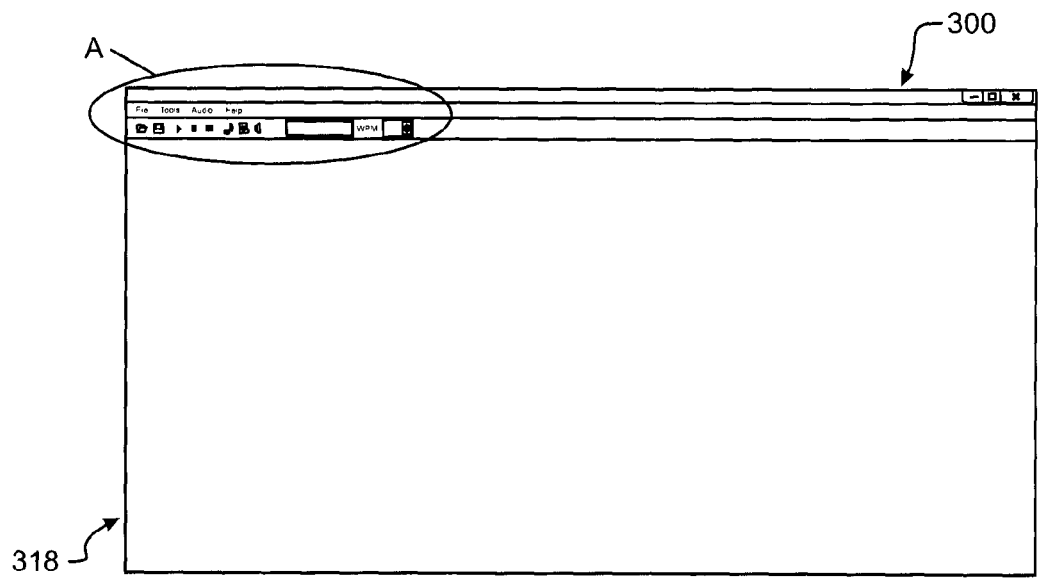
FIG. 3a shows a screenshot of a graphical user interface (GUI) of a soundtrack creation system in accordance with an embodiment of the invention.
Figure 3B:
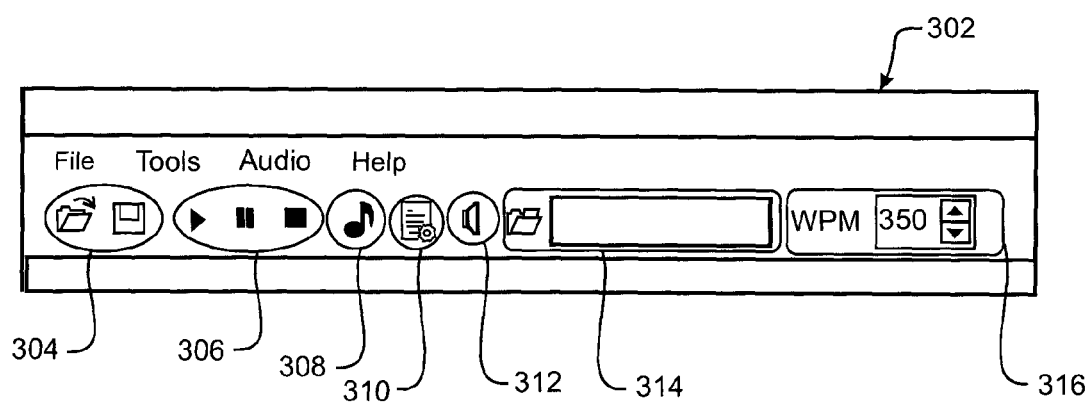

Referring to FIG. 2, a typical soundtrack production process will now be described by way of example only. The soundtrack production process 200 for generating a soundtrack for electronic text commences at 202 by loading or importing an electronic text file containing electronic text data representing the electronic text into the soundtrack creation system. By way of example, the soundtrack creation system may provide the user with a graphical user interface (GUI) 300 as shown in FIG. 3a. FIG. 3b shows a close up of a main toolbar 302 of the GUI 300. The main toolbar 302 comprises various menus, interfaces and quick-launch buttons for the user to interact with when creating the soundtrack. In particular, buttons 304 is provided for opening and saving soundtrack data files. Buttons 306 is provided for playing, pausing and stopping preview playback of a soundtrack. Button 308 is provided to access an interface for editing the playback properties of audio region types. Button 310 is provided for providing an interface for configuring audio volumes for audio region types. Button 312 is provided for assessing an interface for muting or disabling selected audio region types. Interface 314 is provided as a text searching tool for words or phrases within the electronic text. Interface 316 is provided for setting a reading speed for the preview of the soundtrack playback, which may be a reading speed variable value defined in words per minute (wpm).

Figure 4:
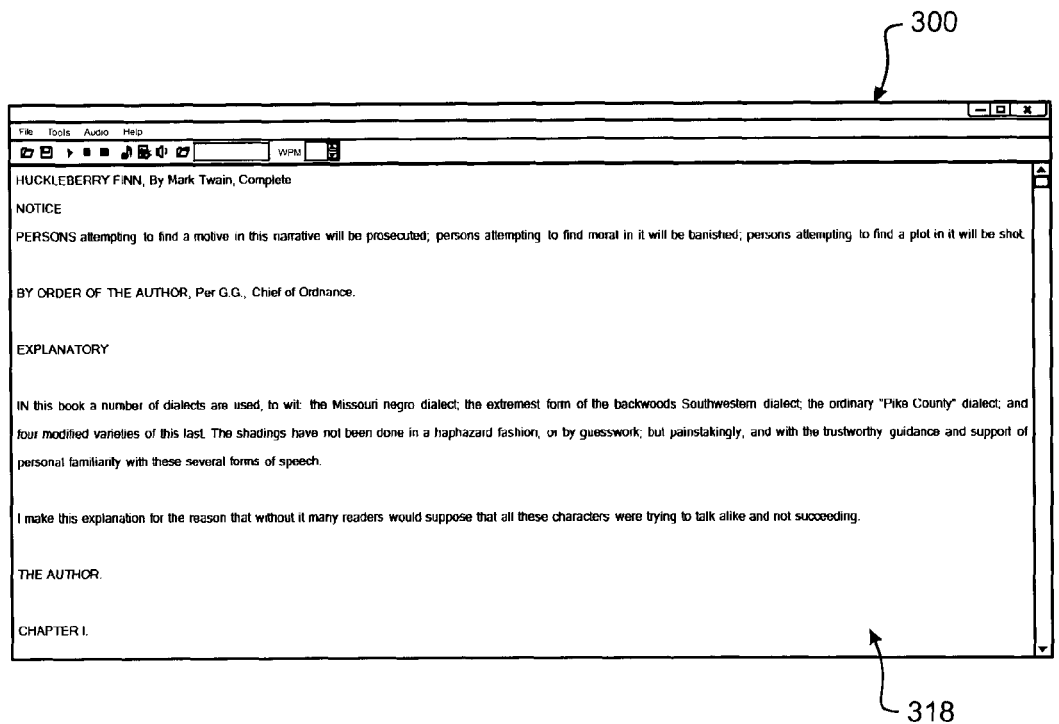
FIG. 4 shows a screenshot of the GUI of the soundtrack creation system displaying an imported electronic text file.
Figure 6:
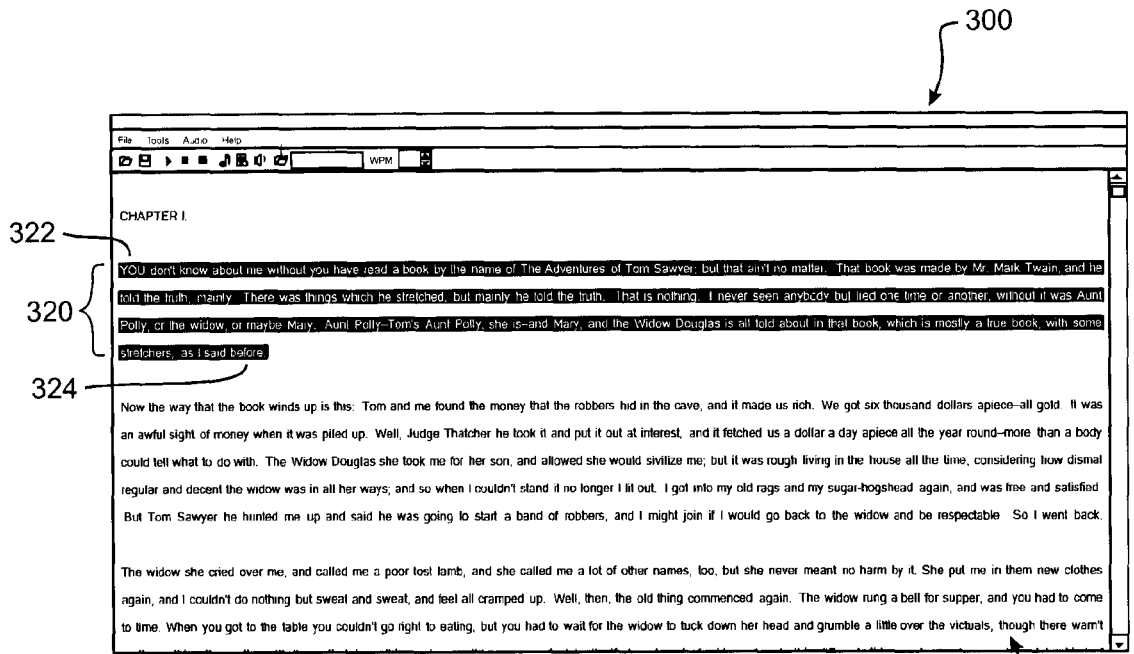
FIG. 6 shows a screenshot of the GUI of the soundtrack creation system and the selection of a text region corresponding to a new audio region.

Reverting to FIG. 2, once the soundtrack creation system is initiated, a home screen is displayed as shown in FIG. 3a which includes the toolbar 302 and a text display area or region 318 to create a new soundtrack for an electronic text. The electronic text file, for example an e-book 204, must be imported or loaded into the system from local or external data storage to the system. As previously described, the electronic text file may be in any available format for electronic text, including by way of example only epub, pdf, rtf, and txt, or any of the other formats mentioned above. Once imported, the e-book file comprising the electronic text data may be subjected to optional format processing 204 depending on the nature of the file format imported. Once formatted, the electronic text is displayed in the display area 318 of the GUI 300 as shown in FIG. 4.

The system is configured to apply or designate a text index 206 to the electronic text displayed based on the number of words or characters in the electronic text. This embodiment will be described in the context of a word-based indexing scheme, but it will be appreciated that a character-by-character based indexing scheme could alternatively be used. The word indexing applies a unique index value to each word in the electronic text. The particular word indexing scheme selected may vary, but the index value associated with each word in the electronic text represents the position of the word relative to the remaining words in the electric text. In this embodiment, a word indexing scheme is applied in which each word has an index value that corresponds to the integer word number or word count associated with that word's position in the electronic text. For example, the first word has an index value '1', the second word has an index value '2' and so on to the last word in the electronic text. However, it will be appreciated that any other word numbering or offset index values relative to a reference point could be applied in alternative embodiments if desired.

After indexing, multiple audio regions for the soundtrack are defined 208. As previously described, the soundtrack comprises multiple audio regions, each defined for playback in a text region designated between a start word and an end word in the electronic text. The playback position and properties configured for each audio region are defined by audio data or metadata associated with each audio region.

Figure 5:
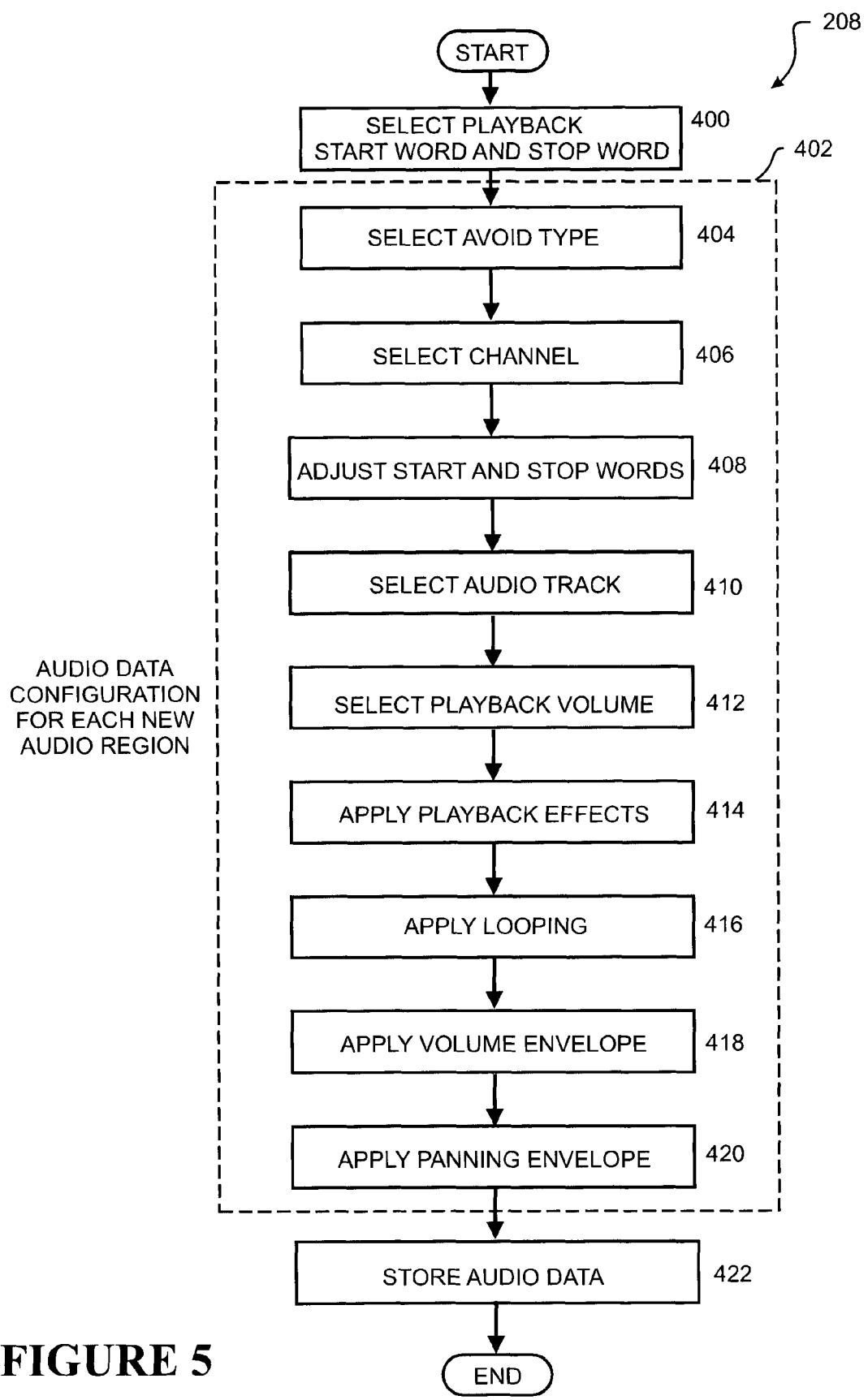
FIG. 5 shows a flow diagram for the process of configuring the audio data for an audio region of the soundtrack in accordance with an embodiment of the invention.

Referring to FIG. 5, the process of defining the audio regions of the soundtrack will be described in more detail. It will be appreciated that the order of the steps is not necessarily essential, and some steps are optional. Each audio region can be considered as being configured for playback over the duration of a corresponding text region in the electronic text that is defined between a start word and end word for the audio region. Each new audio region may be created by initially selecting a text region 400 in the electronic text to which the audio region is to apply. By way of example with reference to FIG. 6, in this embodiment of the soundtrack creation system, the text region may be selected by highlighting the text region 320 in the text display area 318. As shown, the text region has a start word indicated at 322 and a stop word indicated at 324. Once a text region is selected, the soundtrack creation system is configured to generate a new audio region configuration interface 340 shown in FIG. 7 by way of example. The audio region configuration interface 340 is automatically populated with the start word index value 342 and stop word index value 344. In this embodiment, the start word index value 342 corresponds to the word number of start word 322 in the electronic text and the stop word index value 344 corresponds to the word number at the stop word 324 in the electronic text. Additionally or alternatively, it will be appreciated that a new audio region configuration interface may be initiated with blank start and stop fields 342, 344 which may then be manually configured. Additionally or alternatively, the user may simply highlight a start word in the text display area 318 to automatically populate the start word index value 342 and then may manually adjust the stop word index value as desired.

The remaining steps of configuring the audio data 402 for an audio region will now be described in further detail with reference to FIGS. 5 and 7. It will be appreciated that not all the various audio properties for the audio region need to be configured depending on the desired audio playback properties for the audio region and also the order of the configuration steps is not essential and may be modified.

Figure 7:
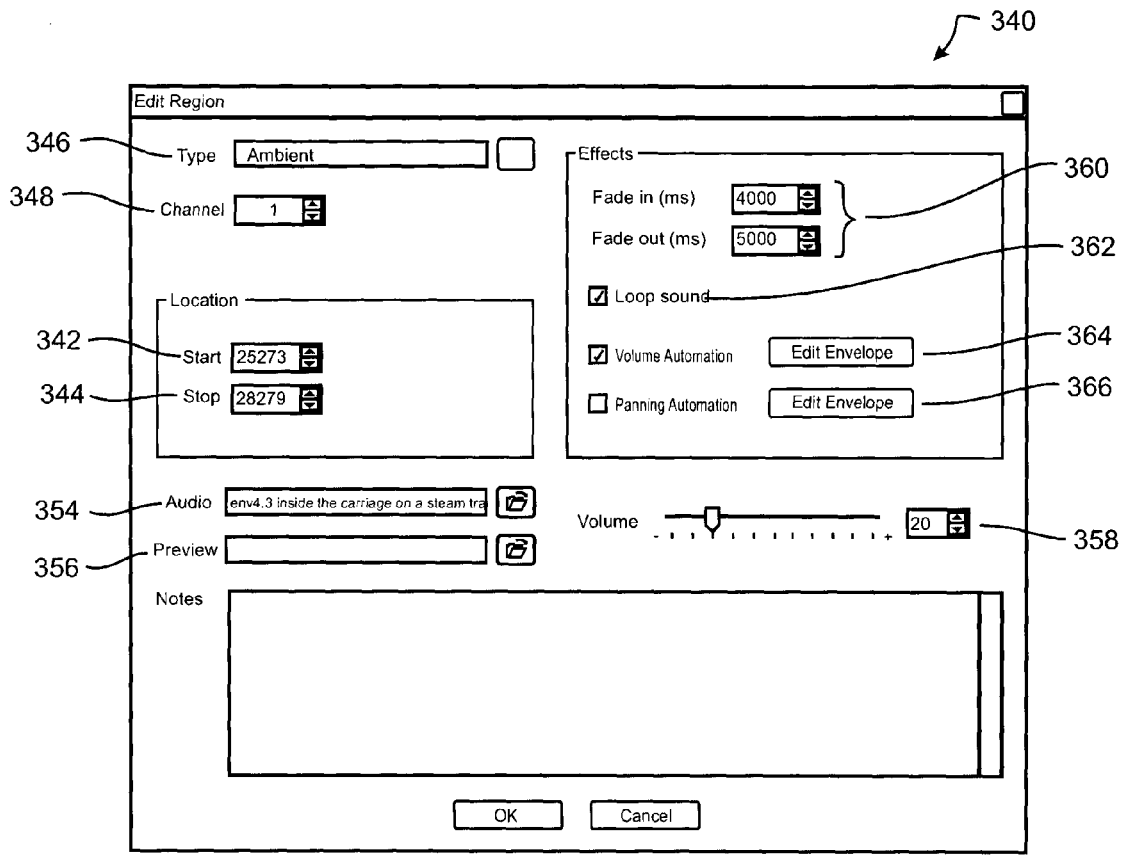
FIG. 7 shows a screenshot of a GUI of the soundtrack creation system for configuring the audio data of a new audio region of the soundtrack.
Figure 8:
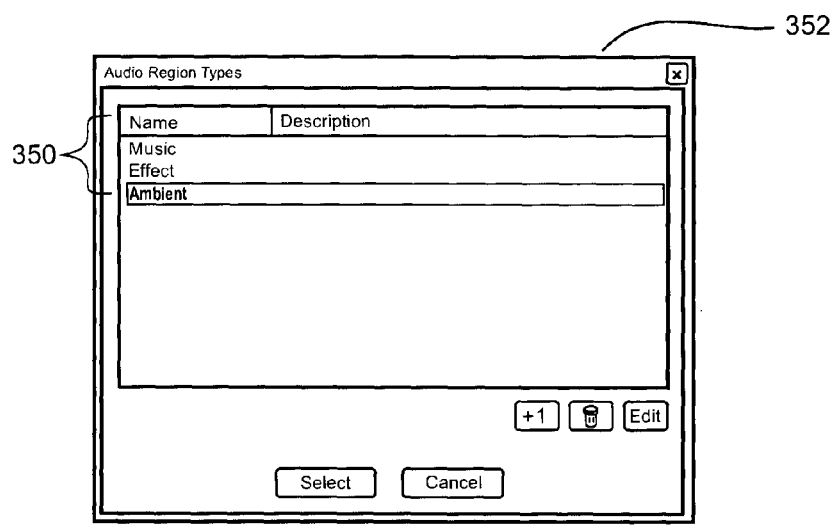
FIG. 8 shows a screenshot of a GUI for designating the audio type of a new audio region of the soundtrack.

An audio type 404 for the audio region is selected as shown at 346 in FIG. 7. Referring to FIG. 8, the audio type for the audio region may be selected from a list of audio types 350 provided in audio region type interface 352. In this embodiment, there are three audio types, namely 'music', 'effect', and 'ambient' as will be explained in further detail later. Each audio region type may have its own global audio playback properties and these properties may be edited. Additionally, audio types may be deleted or added as required. There may be one or a plurality of selectable audio types depending on the soundtrack being configured. The selected audio type is intended to define the nature of the audio region. For example, if an audio region is for background music, then the audio type selected will be 'music'. If the audio region is a sound effect, then the 'effect' audio type is selected. If the audio region is intended to be an ambient sound or noise, then the 'ambient' audio type is selected.

A channel 406 from a set of available channels is selected over which the audio region will playback and as shown at 348 in FIG. 7. In this embodiment, the soundtrack is provided with at least two channels and preferably more channels to enable playback of the audio regions to overlap. Overlapping audio regions are configured to have different channels. By way of example, the soundtrack may provide six channels such that up to six audio regions may overlap at any one time for playback in the soundtrack. However, it will be appreciated that in alternative embodiments a single channel may be provided for soundtracks in which there are no overlapping audio regions such as for soundtracks comprising only sequential or spaced apart audio regions of background music or soundtrack comprising non-overlapping sound effects, ambient noise and background music. The soundtrack creation system may be configured to automatically select or designate different channels to new audio regions that have text regions that overlap with those of existing audio regions.

Optionally, the start and stop index values 342, 344 as shown in FIG. 7 may be manually adjusted 408 to modify the start and stop words between which the playback of the audio region begins and ceases respectively for the audio region if desired.

An audio track is selected 410 for playback in the audio region as shown at 354. The audio track may be an audio file that is selected from an accessible database or music library stored locally or externally to the system. The database or music library may comprise a range of music, sound effects, ambient noise audio files, or any other audio track that may be selected to enhance the reading experience throughout the duration of the electronic text by providing sound effects that match events occurring the electronic text or ambient sounds or music that reflects the mood or atmosphere during passages or portions of the electronic text, by way of example only. The audio file may be provided in any sound file format including but not limited to audio files having the following file extensions: MP3, WAV, AAC, WMA, MP4, M4A, OGG, CAF, AIFF, RAW, FLAC, TTA, GSM, OTS, SWA, VOX, MOD, PSF, RMJ, SPC, and MusicXML. It will be appreciated that the audio track selection may be a file path or link to the destination of the audio file in the database or music library for the audio track selected. It will be appreciated that the natural duration of the audio track selected for one type of audio region may vary compared to audio tracks selected for another type of audio region. Typically, specific audio types may have similar duration ranges. For example, 'background music' audio region types may typically have audio tracks having durations of 2-7 minutes, whereas 'sound effects' may have durations of a few seconds or milliseconds by way of example only.

Selecting an audio track 410 may optionally comprise also selecting a preview audio track as shown in the selection field 356 in FIG. 7. In one embodiment, the preview audio track may be a lower quality and smaller file version than the primary audio track 354 that will be included in the eventual soundtrack data file. For example, the soundtrack creation system may be configured to cue the preview audio track when the user wishes to test the timing and sequencing of the playback of specific audio regions during the soundtrack creation, rather than the system having to load and playback the full high quality audio track 354. In another embodiment, the preview audio track at 356 may correspond to the primary audio track converted into a file format that corresponds to the most suitable or desired audio playback file type of the target hardware device or system upon which the user playback system will be implemented for playback of the soundtrack. For example, the primary audio track may be selected from a database of way file types, and the preview audio track may link to the corresponding audio track in an mp3 format, which may be the preferred file format for a particular target user playback system. It will be appreciated that the preview audio track may be automatically converted from the primary audio track file type or that the database may comprise each audio track in multiple formats for selecting and compiling into the soundtrack. In operation, the soundtrack creation system may be configured to automatically compile the soundtrack data file with audio track links or audio track files in a format corresponding to a desired target audio file format for the user playback system, by either converting the primary audio tracks into the target file format, or by selecting the corresponding audio tracks in the target file format. It will be appreciated that the soundtrack creation system may be operated to produce or provide the same soundtrack in data files comprising different desired file formats for the audio tracks to suit different target hardware systems for the user playback system.

An individual playback volume 412 may be configured for each audio region as shown at 358 in FIG. 7. A volume scale may be provided for configuring the volume of the individual audio region relative to a global volume setting for that particular audio region type selected at 346.

Various playback effects 414 for each audio region may be configured. By way of example only, fade in and fade out settings may be selected as shown at 360 in FIG. 7. The fade in and fade out settings may be based on time period as shown or alternatively based on index values, for example word counts, or the like. The ramp or gradient or rate of the fade in or fade out may be linear or non-linear and configured as desired.

The audio track selected for some audio regions may have a shorter duration than the duration of the audio region itself, depending on the eventual reading speed of the user, which dictates the eventual duration of each audio region. In such situations, it may be desirable to configure the audio track to seamlessly loop such that playback continues for the entirety of the duration of the audio region. Looping 416 may be activated or deactivated as shown at 362 in FIG. 7. The looping may apply seamless looping algorithms. The looping algorithms may be configured to minimise the sense of repetition of an audio track or alternatively may repeat the audio track back-to-back if desired.

Real-Time Playback Effect Data

Optionally, some of the audio regions may further be defined by real-time playback effect data that defines one or more controllable audio playback effect settings that are to be varied across the audio region or a portion of the audio region based on the user's real-time text position. During playback of the soundtrack, the playback system controls/varies the playback effects settings of the audio output system based on the reading position counter (which is indicative of the user's real-time text position) for each audio region having pre-configured playback effect data. In situations where portions of the soundtrack has two or more overlapping audio regions, each having pre-configured playback effect data, the playback effect settings are varied independently for each audio region on its respective separate audio channel.

In this embodiment, the playback effect data is in the form of one or more automation envelopes that are configured for at least some audio regions. An automation envelope defines one or more playback effects or features or sound manipulations that are applied to the audio track of an audio region in real-time during playback across the audio region or a portion of the audio region. For example, the automation envelope may define a controllable audio playback setting that varies in real-time throughout the duration of the audio region playback, and which may be dependent on the real-time playback position relative to the playback duration of the audio region.

In this embodiment, the automation envelope is a programmable function configured to apply real-time sound manipulation to the audio playback of the audio track based on the end user's reading position within the electronic text. For example, the programmable function is dependent on a variable representing the user's real-time playback position (for example the user's real-time text position corresponding to the word or character they are reading) within the audio region playback duration such that the real-time sound manipulation applied to the audio track playback may be configured to vary as desired across the audio region duration (which is dependent on the end user's reading speed). The user's playback position may be represented by the reading position counter corresponding to the index value of the word being read or a higher or lower frequency counter being a product or function of the reading position counter if desired.

In one example, the programmable function may be configured such that the sound manipulation or playback effect setting that is varied during playback of the audio track across an audio region (or a portion of the audio region) between the start index value and stop index value is a function of the playback text position or text offset within or from the start of the audio region, which may for example be defined based on the index values of the audio region. The programmable function may be configured to provide a smoothed manipulation of the desired playback effect setting across the audio region to correspond to a smooth envelope shape. In other embodiments, the automation envelope may be defined by or stored in a look-up table that comprises a column listing the playback positions in the audio region at the desired sampling rate (e.g. word or alternatively index value or alternatively a higher sampling rate than each index value or other discrete positions within the audio region) and a column listing the desired playback effect setting for each real-time playback position. The look-up table may additionally define transition properties between discrete positions, e.g. smooth transitions between changing degrees or levels of application of a playback effect between discrete positions or any other transition effect may be utilised.

The automation envelope may apply across the entire audio region or a portion of the audio region as discussed such that the playback effect settings are manipulated or controlled in real-time during playback according to the user's real-time text position in the electronic text at which they are reading (which has a corresponding position within the associated audio region or regions). The automation envelope may have any desired shape across the audio region, whether ramped, arbitrary, smooth, piece-wise, stepped, or any other linear or non-linear profiles or functions that vary with the playback duration. In one embodiment, the automation envelop shape may be defined by one or more discrete set-points configured for one or more index values representing text positions (e.g. words) in the audio region and the overall remaining envelope shape between the set-points may be interpolated to progress or transition smoothly between the set-points or in a truncated manner or any other interpolation function may be employed.

In operation during playback, as will be explained in further detail with respect to the soundtrack playback module, the frequency of variation or control of the playback effect setting match that dictated by the automation envelope may be varied as desired to control the accuracy of reproduction or application of the envelope shape to the audio region. For example, in some embodiments the playback effect setting may be manipulated or controlled as a rate or frequency corresponding to the reading position counter rate, such that the playback effect setting is modified to match the envelope on a word-by-word basis, i.e. is controlled or changed as required to match the envelope setting at each word in the audio region. Alternatively, a higher frequency of control may be applied in which the playback effect setting is modified at a frequency higher than that of the reading position counter rate such that playback effect setting is controlled or updated to match the envelope shape at least twice or multiple times for each word in the audio region. In some embodiments, a separate automation envelope update counter may be provided that has a frequency (typically higher) that is a product or factor of the frequency of the reading position counter or which is based on the user's reading speed. The soundtrack playback module may be configured to modify or update the playback effect setting in real-time to match the automation envelope setting at that playback position in the audio region defined by the automation envelope update counter such that the playback effect setting is updated each time the automation envelope update counter increments, i.e. updating at the frequency of the automation envelope counter. It will be appreciated that the highest frequency of updating of the playback effect setting to match the envelope is dictated by the hardware and/or sound processor used.

Two examples of automation envelopes will now be described, namely volume enveloping and panning enveloping, but it will be appreciated that the enveloping concept may be applied to any other playback audio property or effect setting that determines the nature or content of the audio output, including but not limited to equalization, filtering, mixing, channel settings, reverberation, distortion, phase-shifting, or any other playback effect.

Figure 9:
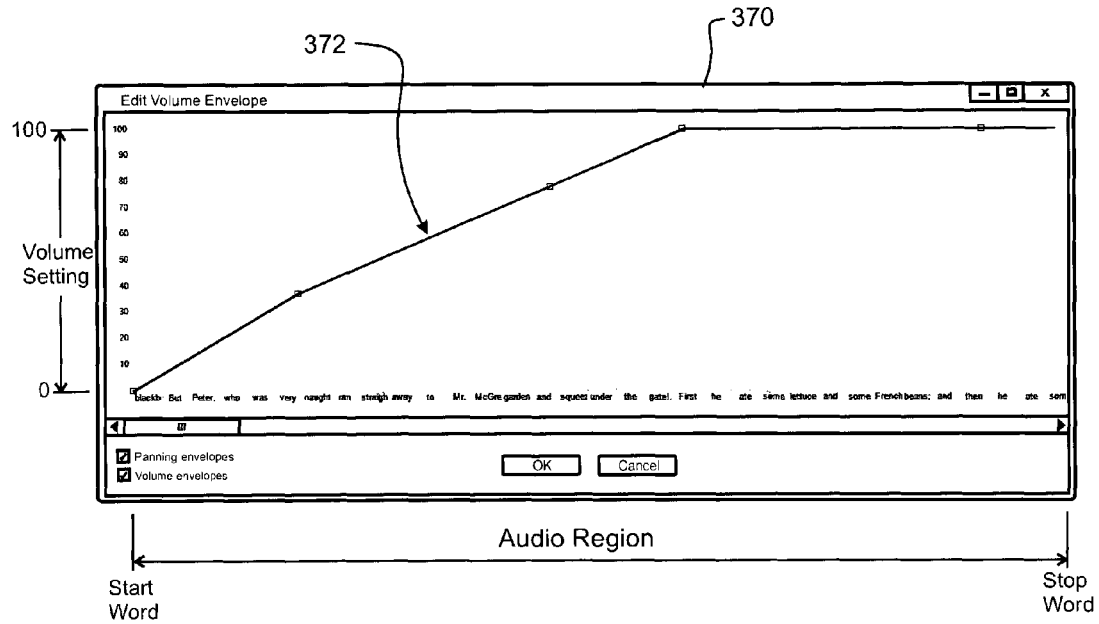
FIG. 9 shows a screenshot of a GUI for configuring a volume envelope to be applied to an audio region of the soundtrack.

Volume enveloping or volume automation 418 may optionally be applied to each audio region in parallel with or as an alternative to any configured fade-in and fade-out playback effects, and as shown at 364 in FIG. 7. Referring to FIG. 9, activation of the volume envelope setting initiates a GUI 370 for the volume envelope interface to enable the user to configure the desired volume envelope across the entire audio region between the start text position and stop text position. Typically, the volume envelope defines the playback volume setting across the audio region relative to a default volume setting. The GUI 370 shows a grid of volume setting on the vertical axis between 0 to 100% and the index values (or corresponding text from the electronic text) for the audio region along the horizontal axis. In particular, a volume setting may be defined across the audio region. For example, the volume setting is shown on the vertical axis of the volume envelope grid from 0-100% of the individual volume setting 358 previously described. Displayed along the horizontal axis of the volume envelope grid is the text region for the audio region, including the words of the electronic text between the start word and stop word for the audio region. In this embodiment, the volume envelope 372 shape may be varied in a piece-wise fashion with a volume setting set-point being configured for each word or a selection of words such that the overall envelope shape is formed or interpolated between the discrete volume set-points as shown, although it will be appreciated that a higher resolution of volume settings may be provided in alternative embodiments if desired. The envelope shape between set-points may be any desired interpolation function, including a smoothing transition or direct point-to-point interpolation or any other interpolation method or function. In this embodiment, the volume envelope shape may be configured by moving the volume envelope line 372 on the grid as desired. In FIG. 9 a relatively gradual increase in volume from the start word at zero volume to 100% at approximately two-thirds through the audio region is shown. Any desired volume enveloping may be applied. It will also be appreciated that the volume enveloping may be used as an alternative to applying fade-in and fade-out effects if desired or alternatively may be used in parallel.

Figure 10:
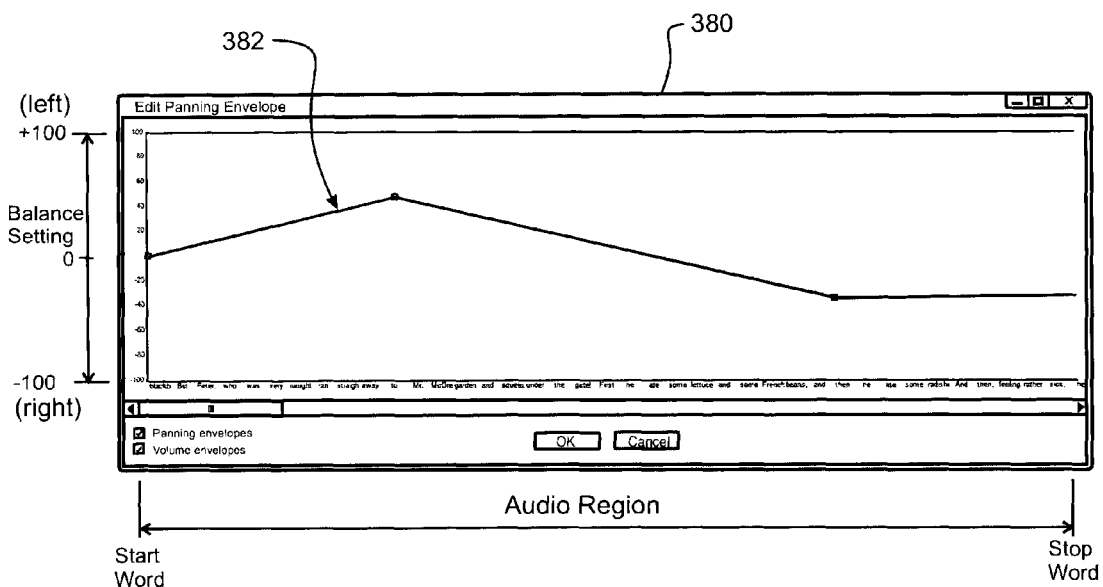
FIG. 10 shows a screenshot of a GUI for configuring a panning envelope to be applied to an audio region of the soundtrack.

Reverting to FIG. 5, a panning envelope 420 may optionally be applied to each audio region, and as shown at 366 in FIG. 7. The panning envelope defines a balance setting or weighting to be applied to the audio output left and right stereo signals for the left and right ears of a user. In other words, the panning envelope defines the balance of the playback volume differential of the audio track between left and right stereo signals relative to a default balance setting across the audio region between the start text position and stop text position. The default balance setting may be centered or balanced with equal volume being applied to the left and right stereo channels. Referring to FIG. 10, the panning envelope may be configured via a panning envelope interface GUI 380, similar to the volume envelope interface 370. The GUI 380 shows a grid for a piece-wise panning envelope line 382 that is defined by a balance setting provided on the vertical axis with the audio region represented by the index values (or the corresponding word equivalents from the electronic text) across the horizontal axis between the start word and stop word as shown. In this embodiment, the balance setting varies between +100% to −100%, with 100% representing full volume to the left channel and nil volume to the right channel, and −100% representing full volume to the right channel and nil to the left channel. The balance setting in this embodiment effectively defines a ratio of the volume applied to the left and right channel. A setting of 0% equals 100% volume applied to each left and right channel. A setting of +20% represents 100% volume to the left channel and 80% volume to the right channel. A setting of −50% represents 100% volume to the right channel and 50% volume to the left channel, and so on. Alternatively, it will be appreciated that any other form or scheme for balancing relative volume between the left and right stereo channels may be applied. Like for the volume envelope, the panning envelope may be configured by dragging or shaping the panning envelope line 382 on the grid into the desired shape. The balance setting may be configured on a piece-wise manner with the balance setting set-points being determined for each word or a selection of words in the audio region, but alternatively a higher resolution of set-points may be applied if desired, and with the envelope shape being determined by an interpolation function between the configured set-points. In the example panning envelope line 382 of FIG. 10, the audio region starts with a centered balance and progresses into a slightly left channel dominant balance setting, and then progressively tracking toward a slightly right channel dominant balance setting, which is then kept constant until the end of the audio region.

Configuring the panning envelope for audio regions enables various playback effects to be obtained, including providing a sense of movement of the sound or other static or dynamic spatial properties. It will be appreciated that the audio tracks of audio regions may have their own stereo properties and that the panning envelope may be used in parallel to enhance those inherent stereo or spatial effects. Additionally, for audio tracks without stereo effects or which are monaural, the panning envelope may provide a sense of movement or spatial location to the audio playback when heard by the user. The panning envelope may enhance the reading experience, such that movement and/or the spatial properties of the audio may correspond to the content of the electronic text. For example, sound effects may be able to pan from the left ear to the right ear to create a sense of movement in the case of a text region which relates to a train passing by. Or if the electronic text refers to a gunshot being heard to the left of a character, the appropriate balance to the left channel may be applied to an audio region comprising an audio tracking representing a 'gun shot' sound effect.

The volume and panning envelope settings may be applied to work in combination to produce the desired playback effects. Either of the configuration interfaces 370, 380 may be activated to display both the volume envelope line 372 and panning envelope line 382 on the same grid if desired.

Figure 11:
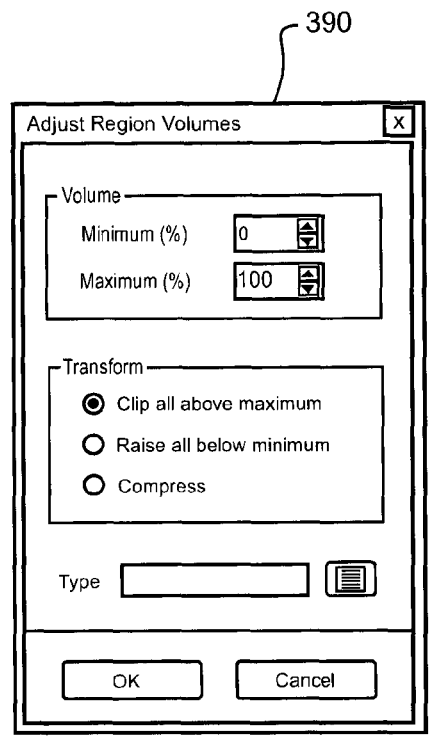
FIG. 11 shows a screenshot of a GUI for adjusting the global playback volume of audio regions in the soundtrack having a particular audio type.

Referring to FIG. 11, a GUI 390 is provided for configuring the global volume settings to be applied to audio regions having a particular audio type. For example, audio regions having been defined with an 'effect' audio type may have global volume settings comprising a minimum and maximum volume and transformation configurations in which the volume of individual audio regions may be amplified or clipped to move their output playback volume into the volume band or region defined by the global maximum and minimum volume settings.

Figure 12:
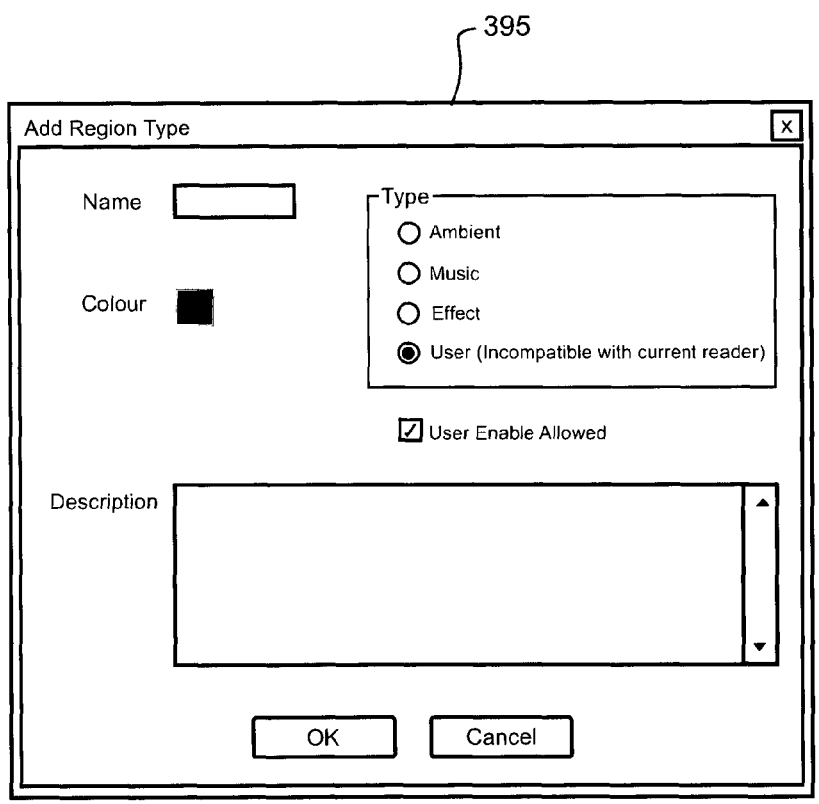
FIG. 12 shows a screenshot of a GUI for creating a new audio type for audio regions of the soundtrack.

Referring to FIG. 12, a GUI 395 is provided to enable a user to define additional audio types in addition to the default audio types of 'ambient', 'music', and 'effect'.

Figures 13, 14:
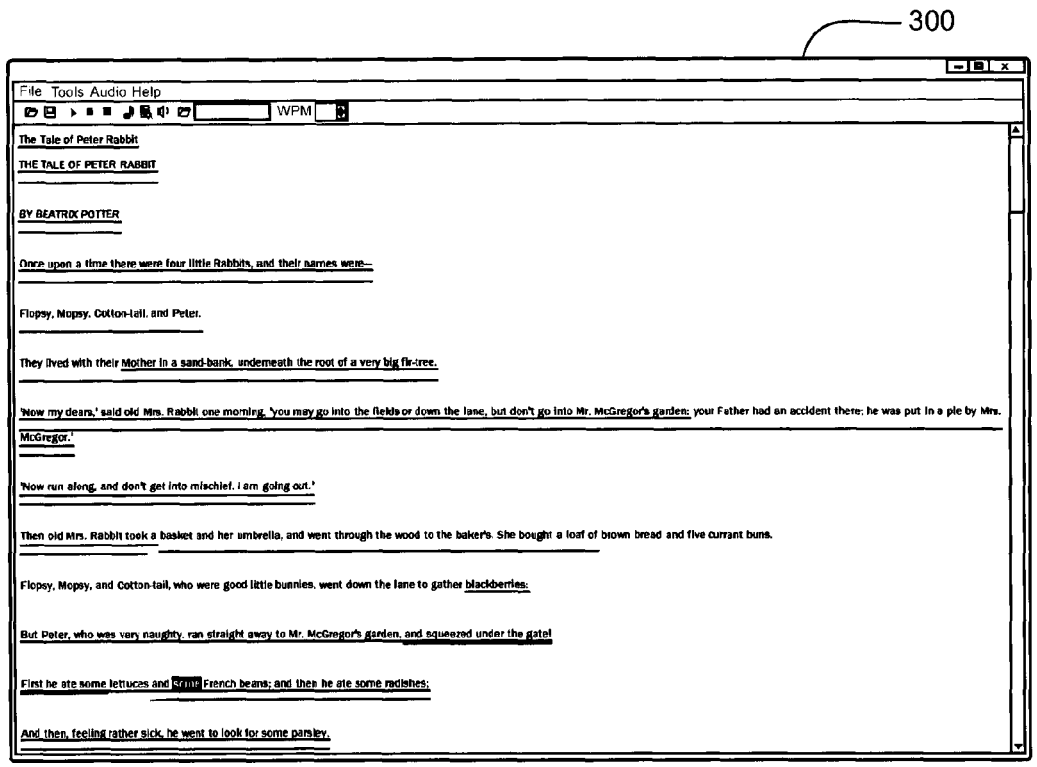
FIG. 13 shows a screenshot of the GUI of FIG. 4 in which multiple audio regions have been applied to an imported electronic text file in a partially created soundtrack.
FIG. 14 shows a screenshot of an audio data table containing the audio data for multiple audio regions of a partially created soundtrack.

Referring to FIG. 13, the GUI 300 for the soundtrack creation system is shown for a portion of electronic text in which a number of audio regions have been configured for the soundtrack. The audio regions are represented graphically by the text underlines. In this embodiment, audio regions of a specific audio type are designated a specific colour of underline. As shown, audio regions may overlap as shown by the overlapping underlines and the overlapping audio regions may be of the same or different audio type.

Reverting to FIG. 5, as the audio regions are configured, the configured audio data for each audio region is stored in memory. FIG. 14 shows a GUI 397 showing a table of audio data for configured audio regions and their associated settings for a partially completed soundtrack. Each line in the table represents a separate audio region. The columns define the various audio playback properties configured for each audio region.

Reverting to FIG. 2, once the audio regions of the soundtrack have been defined and configured, the audio data of the audio regions is compiled 210 into an output data file 212 representing the soundtrack. The audio data may be configured and compiled in various ways as will be appreciated, and the data may be compressed, encoded and/or encrypted. Essentially, the audio data is packaged or compiled into a data file or files in a manner that can be subsequently decompiled, extracted and/or decoded by a user playback system that is configured to interpret the contents of the soundtrack data file(s). It will be appreciated that the collective audio data comprises the audio track playback properties for each audio region described above, including the start word and stop word, and various other optional playback effects, including but not limited to volume enveloping, panning enveloping, fade-in and fade-out, and the like. Additionally, the audio data for each audio region may comprise the audio track sound file or alternatively links to the audio track file in an accessible database or music library for that audio region may alternatively be used to reduce the soundtrack file size if desired. It will be appreciated that the compiling process may involve compression and encryption in some embodiments.

The soundtrack output data file as shown at 212 is the output of the soundtrack production or creation method. In addition to the audio data, the soundtrack data file may additionally incorporate a header file or header data containing information about the sound file itself and the associated corresponding electronic text to which it relates. Optionally, the soundtrack data file may incorporate the electronic text data representing the electronic text itself such that the soundtrack file is provided in the form of a multimedia data file comprising both electronic text (e.g. an e-book) for visual display and an associated audio soundtrack for playback.

3. A System and Method for Displaying Electronic Text and Controlling Playback of a Soundtrack User Playback System—Overview An embodiment of the user playback system for displaying electronic text (e.g. an e-book) and controlling playback of the associated soundtrack produced by the soundtrack creation system above will now be described by way of example with reference to FIGS. 15-24.

In this embodiment, the user playback system may be provided or implemented as an application program or software running on an electronic hardware system or platform that is the same or similar to that described with reference to FIG. 1. Typically the user playback system will be implemented on any suitable portable or non-portable hardware device or system having suitable processor and memory capabilities, a display for displaying the electronic text, and an audio output system for playback of the soundtrack over speakers or headphones. By way of example only, the hardware device or system may be portable consumer electronic devices such as smartphones (e.g. iPhone), cell-phones, tablets (e.g. iPad), dedicated e-Reader or e-book devices, laptops, notebooks or any other suitable electronic devices. Alternatively, the user playback system may be implemented on a desktop personal computer or any other non-portable hardware system if desired. Typically, the user playback system is provided as an application program or software that may be loaded and run on the hardware devices or systems mentioned above, but it will be appreciated that a dedicated electronic device may be configured and built as a stand-alone user playback system if desired. It will be appreciated that the user playback system may be implemented in the form of a website interface. For example, a user may access the website over the internet that is configured to provide a user playback system for viewing the electronic text and providing playback of the corresponding soundtrack via the user's interne browser.

Figure 15:
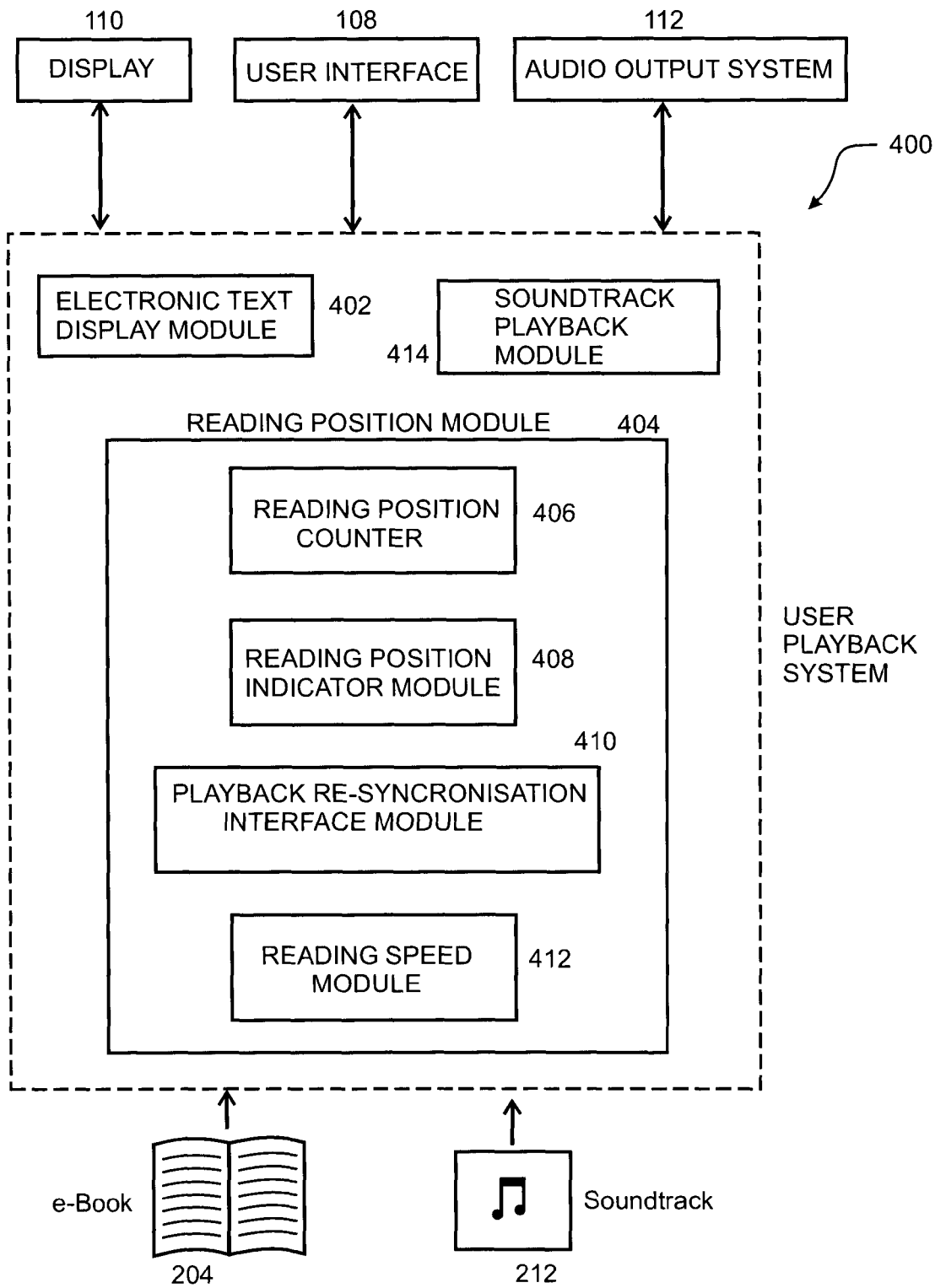
FIG. 15 shows a schematic block diagram of a user playback system for displaying electronic text and for controlling playback of a soundtrack in accordance with an embodiment of the invention.

Referring to FIG. 15, the primary functions and data processing of an embodiment of the user playback system will now be described. The various functions and data processing of the user playback system will be described with reference to dedicated modules configured to carry out the functions and data processing for clarity of description of the user playback system. It will be appreciated that the modules may be configured or implemented in software in various ways and that the processes and functions performed by the modules may be integrated into a reduced number of consolidated modules or further expanded and separated into a larger number of modules depending on design requirements.

In FIG. 15 the main modules of the user playback system 400 are shown and their interaction with various components of the hardware platform on which the user playback system is running, such as a display 110, user interface 108 and audio output system 112. The other aspects of the hardware system, such as processor 102, memory 104, data storage 106 and any other communication links or components are not shown for clarity.

The user playback system 400 comprises an electronic text display module 402 that is configured to process electronic text data representing the electronic text and controls display of the electronic text on the display 110 in response to user input from the user interface 108. The display 110 may be a conventional electronic display (e.g. LCD or LED display screen) with the user interface 108 comprising any one or more typical input devices such as, but not limited to, buttons, dials, switches, mouse, touch-pad, keyboard, voice commands or any other tactile, auditory or visual user input system or device. In a preferred embodiment, the hardware system is provided with an integrated display 110 and user interface 108 in the form of a touch screen display, which are commonly available on many portable electronic devices, such as tablets, smartphones, notebooks and the like.

A reading position module 404 is provided for processing and various reading position functions. For example, a reading position counter 406 is configured to generate a reading position counter representing an estimated current reading position of the user in the electronic text. A reading position indicator module 408 is provided for displaying a reading position indicator on the display representing the estimated reading position of the user. A playback re-synchronization interface module 410 is provided for enabling the user to re-synchronize the playback of a soundtrack with their reading position or a new desired reading position. A reading speed module 412 is provided for maintaining a reading speed variable representing the user's reading speed and functions for automatically or manually adjusting the reading speed variable.

A soundtrack module 414 is provided for coordinating the playback of the audio regions of the soundtrack over the audio output system 112 based on the reading position counter to synchronize playback of the soundtrack with the user's reading of the electronic text.

The user playback system is configured to receive and process the soundtrack data file 212 and associated electronic text data file 204, whether combined into a multimedia data file or stored as separate data files, to generate the visual display of the electronic text and audio playback of the accompanying soundtrack.

The individual modules of the user playback system 400 will now be described in further detail below.

Electronic Text Display Module

The electronic text display module is configured to process and extract the electronic text data from the e-book file 204. The electronic text display module may be any text layout engine component for parsing and rendering electronic text for display on the display screen 110 as will be appreciated by those skilled in e-Reader technology or electronic text display generally. One common example of such a text layout engine is UIWebView, which renders HTML content for display on a screen. The electronic text display module provides the user with various navigation tools or a navigation interface that is operable to traverse the pages or content of the e-book as desired, including page-skip, page-turn, chapter-skip, scrolling and the like, as will be appreciated by those skilled in e-Reader technology. The navigation tools or interface may be operated via the user interface 108, such as via interaction with a touch-screen display, as is known in e-Reader technology.

Referring to FIG. 21, the electronic text displaying module may be provided with a font setting interface 540 to enable the font size of the display or other features of the display to be altered as will be appreciated by those skilled in e-Reader technology.

Reading Position Counter

The reading position counter 406 generated by the reading position module 404 represents the estimated current text position in the electronic text that the user is currently reading. In this embodiment, the counter may represent the index value corresponding to the user's estimated current text position. In this embodiment, the reading position counter increments at a rate based at least partly on a configurable user reading speed variable, which may be generated and maintained by the reading speed module 412 to be explained later.

In this embodiment where the electronic text has been indexed based on number of words, the reading position counter may represent the word number or word count corresponding to the estimated position (word) in the electronic text that the user is reading. The counter is configured to increment at a rate based on the reading speed variable, which may be provided as a numerical value such as words per minute (wpm) or any other suitable reading speed metric. By way of example, if the reading speed variable is set to 400 wpm, then the reading position counter will increment by 1 every 0.15 seconds.

The reading position counter may be modified or controlled by data received from the electronic text display module representing the user's interaction with the electronic text (i.e. which page they are reading or page skipping). In some embodiments, the reading position counter may be configured such that the initial reading position counter value automatically corresponds to the index value of the first word on any new page selected for reading or the page on which reading commences based on data received from the electronic text display module. The counter may then increment at a rate based on the reading speed variable. In some embodiments, when the end of a page is reached by the reading position counter, a 'page turn' or 'new page' transition may automatically occur such that the counter increments continuously and provides for automatic page turning. In other embodiments, the reading position counter may be configured to pause or halt at the last word of a page, awaiting to commence again based on a user 'page turn' or 'next page' input.

A 'reading pause' button or input may be provided for the user to activate when they wish to pause reading and playback of the soundtrack module, and the reading position counter may halt when a 'reading pause' is initiated, which will also cause a pause in the playback of the soundtrack.

Reading Position Indicator Module

The reading speed position indicator module 408 is configured to generate a visible moving reading position indicator on the display 110 representing the current estimated text position in the electronic text that the user is reading. The reading position indicator module interacts with the electronic text display module to present a reading position indicator on the display based on the reading position counter.

In one embodiment, the reading position indicator may be an 'inline' indicator that is displayed within the lines of text. For example, in this word-based indexing embodiment the reading position indicator may be configured to traverse the lines of text word-by-word such that the position of the indicator corresponds to the word represented by the current reading position counter so as to highlight, identify or indicate the current estimated word being read. The inline indicator may be any form of a marker, including an underline as shown at 510 in FIG. 16, a marker dot or ball 512 located in the vicinity or adjacent (e.g. above, below or adjacent on sides) of the word being read as shown in FIG. 17, or any other marker or system for highlighting the word corresponding to the real-time reading position counter value, including but not limited to a change in font size, font shape, or font colour of the word corresponding to the reading position counter value, or a change in text background colour in the vicinity or associated with the word. The marker may jump from word-to-word, or traverse continuously between the words.

In other embodiments, the reading position indicator may be a 'margin' or 'line' indicator that is displayed in the page margin (left or right) of the electronic text, and which is configured to slide, track or move down the page line-by-line such that the position of the indicator corresponds to the line of electronic text containing the current estimated word being read based on the current reading position counter value. The 'margin' indicator may be configured to jump from line to line, or alternatively continuously move down the margin such that its position reflects the estimated word position within each line currently being read. For example, a slider at the top of a new line may represent the reading position counter corresponds to the user reading the start or first word of the line, a slider in the middle of the line corresponds to the middle portion or words of the line, and a slider below the line represents the reader is at the end of the line and transitioning into the start of a new line. An example of such a 'margin' indicator is shown at 514 in FIG. 18. In other embodiments, the 'line' indicator may be an underline, or highlight, or change in font size, or change in font shape, or change in font colour, or a change in text background colour of the entire current line of text being read.

As shown in FIG. 19, a tools menu 516 may be provided to enable a user to determine or select which reading indicator(s) to display at 518, including the 'inline' indicators, such as the 'underline' or 'ball', and the 'margin' indicator, such as the 'slider'. It will be appreciated that the user may activate both an 'inline' and 'margin' indicators to be displayed together. Alternatively, the reading position indicators may be deactivated if the user desires.

Playback Re-Synchronization Interface Module

A playback re-synchronization interface module 410 is provided in this embodiment to enable a user to re-synchronize playback of the soundtrack with the user's current reading text position should synchronization be lost for any reason such as reading interruptions or reading pauses, or if the user wishes to commence reading at a new particular arbitrary text position in the electronic text, whether behind or forward of the current reading position.

The playback re-synchronization interface module is configured to respond to particular user re-sync input that indicates re-synchronisation is required. The user re-sync input comprises information indicative of the desired re-sync text position in the electronic text where the reader is currently reading or wishes to commence reading.

In one example, the user re-sync input may be in the form of a user highlighting or indicating the re-sync text position via tactile input into the touch screen display. For example, the user may tap, double-tap, or press on the word or position in the electronic text corresponding to the desired re-sync text position. Alternatively, the user may provide a re-sync input via moving a cursor or pointer on the display via a user input device such as a PC mouse or touch-pad or similar, and selecting the word with a mouse click or operation of another associated button of the user input device. In response to this user re-sync input, the re-synchronisation interface module is configured to reset or modify the reading position counter 406 to match the index value corresponding to the word at the re-sync text position. As will be explained in further detail later, the playback of the soundtrack is controlled by the soundtrack playback module 414 and any modification of the reading position counter will be sensed by the soundtrack playback module 414, which responds by halting current soundtrack playback and re-starting or re-cueing the soundtrack playback to correspond to the new reading position counter. As will be explained in further detail later in regard to the soundtrack playback commencement, the soundtrack playback module is configured to intelligently cue the entire soundtrack corresponding to the new reading position counter. This involves initiating playback of any one or more active audio regions at the new counter position, including cueing the playback positions at offset cue-times within the audio tracks of the audio regions to correspond to the position of the new counter within any active audio regions. For example, the new counter position may not be at the start of an audio region, but could be part way through an audio region and in such cases the audio track is cued to initiate playback at an offset cue-time part-way through the audio track accordingly, rather than at the default start time=0 s of the audio track. In this embodiment, the re-synchronisation module operates in the background and monitors and responds to a user re-sync input by the user.

In another example, the user re-sync input may be in the form of a user dragging the reading position indicator ('inline' or 'margin') to the new desired re-sync text position via interaction with the touch screen display, or via operation of a user input device. Once the reading position indicator is moved to the re-sync text position, the re-synchronisation interface module is configured to reset or modify the reading position counter 406 to match the index value corresponding to the word at the re-sync text position as in the above example, which then causes the soundtrack playback to be re-synchronised to correspond with the new position.

Reading Speed Module

The reading speed module 412 maintains a reading speed variable representing the user's estimated reading speed. In this embodiment, the reading speed variable is a numerical value corresponding to words per minute (wpm) although any other metric for representing or measuring reading speed may alternatively be used.

Initial Setting

When a user begins reading a new e-book, the reading speed variable may be automatically configured to have a default value representing the average reading speed for a population or alternatively the reading speed module may be configured to access stored historical reading speed data for the user and load the user's historical reading speed into the reading speed variable initially. This initial setting may then be adjusted or customised manually and/or automatically to the user before or during reading using any of the techniques described below.

Reading Speed Test

Referring to FIG. 19, a reading speed test may be activated 524 in the tools menu 516 to initiate a reading speed test interface. The reading speed test calculates a reading speed value (e.g. wpm) based on the time required for the user to read a default portion of text, the length of which is known. The calculated reading speed value is loaded into the reading speed variable of the system to replace the initial or current setting.

Manual Adjustment

The reading speed variable may be manually adjusted, either directly or indirectly, by the user at any stage of the reading process as desired, whether in real-time during reading of the electronic text and playback of the soundtrack, or before reading has commenced or during a reading pause, when the soundtrack playback is paused. Any one or more of the following methods may be offered to the user to adjust their reading speed variable.

By way of example, some direct manual adjustment methods follow.

In one example, referring to FIG. 19, a slide scale 522 may be provided which the user may operate to increase or decrease their reading speed variable in the tools menu 516.

In another example, a reading speed input field may be provided for the user to manually input their numerical reading speed.

In a further example, the may be presented with a user adjustment interface in the form of 'increase' or 'decrease' adjustment buttons (e.g. +/− buttons) to incrementally increase or decrease the current reading speed variable by predetermined value in a real-time reading speed adjustment interface during reading. The adjustment buttons may be presented to the user on the display alongside or in an area adjacent to the electronic text and when activated, the reading speed module may activate an 'inline' or 'margin' reading position indicator to appear (if not activated already) such that the reading position indicators moves relative to the text (either inline or in the margin as previously described) at a rate dependent on the reading position counter, which is in turn dependent on the reading speed variable. The user may then adjust the reading speed variable using the adjustment buttons until the reading position indicator traverses the text at substantially the same speed or rate as the user reads the text, i.e. such that the reading position indicator follows the current word being read. The reading position indicator provides the user with visual feedback as to the current reading speed variable setting and assists in the calibration of that variable to match the user's reading speed during real-time reading of the electronic text. In particular, as the electronic text and reading position indicator are simultaneously displayed with the user adjustment interface on the display screen, the user can view in real-time the effect of any adjustment of the reading speed variable because the rate of movement of the reading position indicator changes according to their adjustment. Once adjustment is complete, the reading position indicator may disappear after a predetermined period of inactivity in adjustment should the reading position indicator(s) have been deactivated by the user previously. In alternative embodiments, the user adjustment interface may be in the form of physical +/− buttons, or an operable dial (graphical on the display or a physical dial) which is configured to increase the reading speed variable when rotated in one direction, and decrease the reading speed variable when rotated in the other direction, or an operable slider (graphical on the display or a physical slider) that is movable along a scale and which is configured to increase the reading speed when slid to one end of the scale, and decrease the reading speed variable when slid to the other end of the scale, or any other suitable user adjustment input for increasing or decreasing the reading speed variable.

By way of example, some indirect manual adjustment methods follow.

In one example, a reading speed adjustment may be provided in the form of a tracking interface. When initiated, the tracking interface is configured to sense the rate or speed of movement of a user's finger (or input device representing the user's finger such as a stylus) on the surface of the touch screen or movement of a cursor or pointer on the display screen controlled by a user input device such as a PC mouse or touch-pad or similar, either in-line with the text from left to right or right to left word-by-word (e.g. a substantially horizontal movement across the displayed text), or down or up the page of text line-by-line (e.g. a substantially vertical movement relative to the displayed text), for a tracking period, depending on the reading direction of the language of the electronic text. The user moves their finger or other input to trace the words or line of the electronic text on the display as they read them. In this embodiment, the speed or rate of movement may be calculated based on the number of words traversed and the time taken for a tracking period. The speed or rate of movement calculated or measured, for example in wpm, can then be used to update the reading speed variable. The start and end of the tracking period may be defined between when the user initiates and ceases the movement. In the finger contact embodiment, the movement is initiated when the user touches the screen with their finger to initiate a movement and ceases when the user disengages their finger from the touch screen for example. In the pointer or cursor embodiment, the movement is initiated when the user actuates a control button associated with the user input device, e.g. a mouse click or similar. In this reading speed adjustment, the user follows the text they are reading with their finger on the screen, whether 'inline' with the text word-by-word horizontally or down the page of the text line-by-line vertically, whether in the margin adjacent to the text or within the text. In one form, the quantity of text read or traversed is calculated by the text (e.g. number of words or characters) located between a start text position of the movement and the end text position of the movement (e.g. based on the difference between the index values at the detected start and stop text positions). In another form, the quantity of text read during the movement is determined by incrementing a counter after each new word or character is passed by the finger, input device, or cursor or pointer, when inline tracking is employed. In this form, the measurement of reading speed may be periodically or continuously updated during the movement based on the counter and time taken from the start of the movement.

In another example, similar to the previous tracking interface example, a reading speed adjustment may be provided in the form of a slider drag interface. This operates in a similar manner to the tracking interface, except that the user is presented with a reading position indicator ('inline' or 'margin') in the form of a slider which they drag or slide via an operable user input (whether a finger in the context of a touch screen display, or a cursor or pointer controlled by a PC mouse or touch-pad or similar) along the lines of text ('inline') or down the margin of the text ('margin') to reflect their reading position as they read. In particular, the user input should drag the reading position indicator to follow the text they are reading as they read it. The slider drag interface is configured to calculate or measure the rate or speed of the traverse of the slider based on the number of words traversed and the time taken for a tracking period, and the same options as described for the previous tracking interface example also apply to the slider drag interface. As with the previous example, the calculated or measured speed or rate of movement, for example in wpm, is then used to update the reading speed variable. The slider may be configured or restricted to particular movement paths in-line with the text, traversing word-by-word (or character-by-character), line-by-line, or in a path along the margin of the page of electronic text if desired to guide the traverse for the measurement.

Automatic Adjustment

Additionally or as an alternative to the user manual adjustment techniques above, the reading speed module may be provided with an automatic adjustment module that is configured to automatically adjust or update the reading speed variable based on the rate at which the user is traversing the electronic text as determined by arbitrary user inputs indicative of their current reading position within the electronic text. As shown in the tools menu 516 in FIG. 19, the reading speed module may be provided with an interface 520 for activating or deactivating the automatic adjustment module. An embodiment of this automatic adjustment method will be described with reference to FIGS. 22-24.

Figure 22:
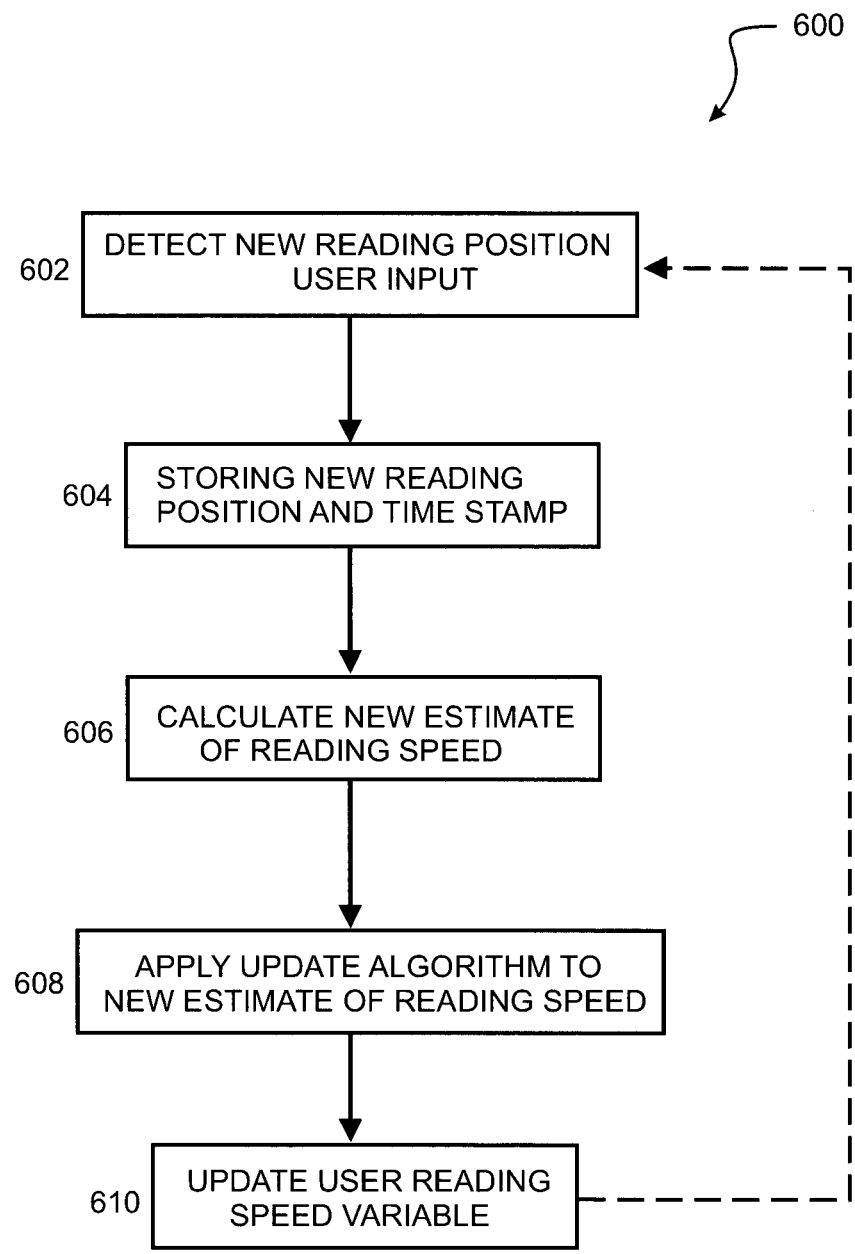
FIG. 22 shows a flow diagram of an automatic adjustment method for updating a user reading speed variable based on arbitrary reading position inputs from the user in accordance with an embodiment of the invention.

With reference to FIG. 22, the automatic adjustment module is configured to continuously sense 602 or detect a specific 'reading position user input' that is indicative of the current text position (e.g. word or character) the user is reading. The reading position user input may be a pre-configured or pre-determined type of user input that is monitored by the automatic adjustment module. If the user playback system comprises a touch screen display, the reading position user input may be in the form of a 'touch input' such as a user tapping or pressing on the surface of the display screen at the location of the word or character they are currently reading, whether with their finger or a user input device, such as a stylus. The tapping may be a single tap or a double-tap, and the automatic adjustment module is configured to sense for such an input. Alternatively, the reading position user input may be in the form of a display cursor or pointer being moved by the user via a user input device such as a PC mouse or touch pad or tracker ball or similar, to the current word or character they are reading and selecting that word or character with an action button of the user input device, for example by clicking the mouse button or other button associated with the type of user input device employed. The reading position user input may be any arbitrarily selected text position within the electronic text that corresponds to the word or character the user is currently reading, and may occur at any arbitrary time determined by the user. The user may determine the frequency of the reading position user inputs, and the time interval between inputs may be random. For each page of electronic text displayed, the user may arbitrarily make none, one, or multiple reading position user inputs as they read the electronic text on the page. For example, as the user is reading a page on a touch screen they may tap or press on any word or otherwise select or indicate the word as they read it, and the automatic adjustment module will detect this as a new reading position user input. Each time a new reading position user input is detected, the index value (e.g. word or character count) corresponding to the user selected text position (word or character) in the electronic text is stored 604 in memory, along with a time stamp of when the input was detected.

Figure 23:
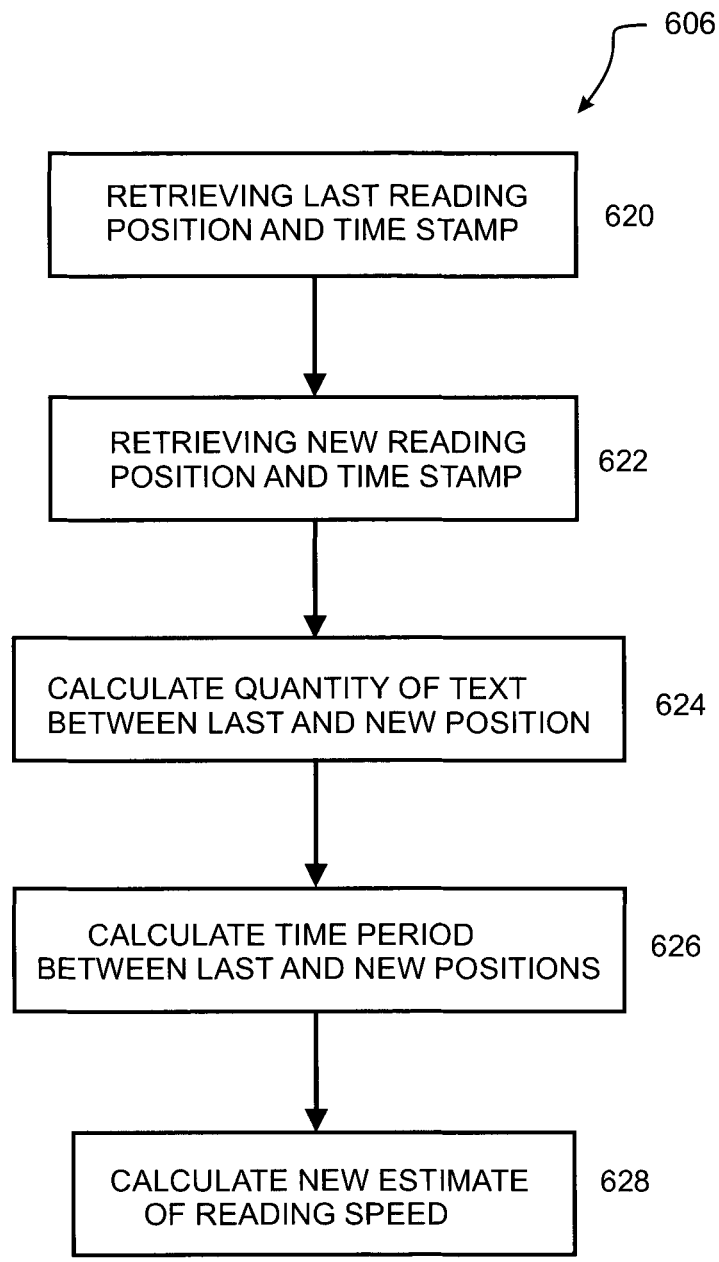
FIG. 23 shows a flow diagram of a method for calculating a new estimate of the user's reading speed based on successive arbitrary reading position inputs from the user within the automatic adjustment method of FIG. 22 in accordance with an embodiment of the invention.

Upon detection of a new reading position user input, the automatic adjustment module is configured to calculate a new estimate of reading speed 606. Referring to FIG. 23, the reading speed calculation will be explained. Firstly, the index value and time stamp of the last stored reading position user input is retrieved 620 from memory. Then, the index value and time stamp corresponding to the new reading position user input is retrieved 622 from memory. The quantity of text (e.g. number of words or characters) between the last and new reading positions is then calculated 624 by virtue of the difference between the respective index values. The time period between the last and new reading positions is then calculated 626 by virtue of the difference between the respective time stamps. Finally, a new estimate of reading speed (e.g. in wpm or wps) is calculated 628 based on the length of text and time period determined. It will be appreciated that in alternative embodiments time stamps need not be determined, and that a separate timer may be utilised to record the time period between successive reading position user inputs.

Reverting to FIG. 22, once the new estimate of reading speed has been calculated, an update algorithm is initiated to generate an updated user reading speed variable. In some embodiments, the update algorithm may simply replace the existing reading speed variable with the new estimate of reading speed. In other embodiments, the update algorithm may apply a moving or weighted average to a number of the most recent calculated estimates of reading speed. Additionally, the update algorithm may employ a probability function to the new estimate of reading speed to minimise the weight applied to anomaly or erroneous new reading speed estimates that are outliers relative to the current reading speed variable, for example caused by a reading interruption or a user prematurely page-skipping or similar.

Figure 24:
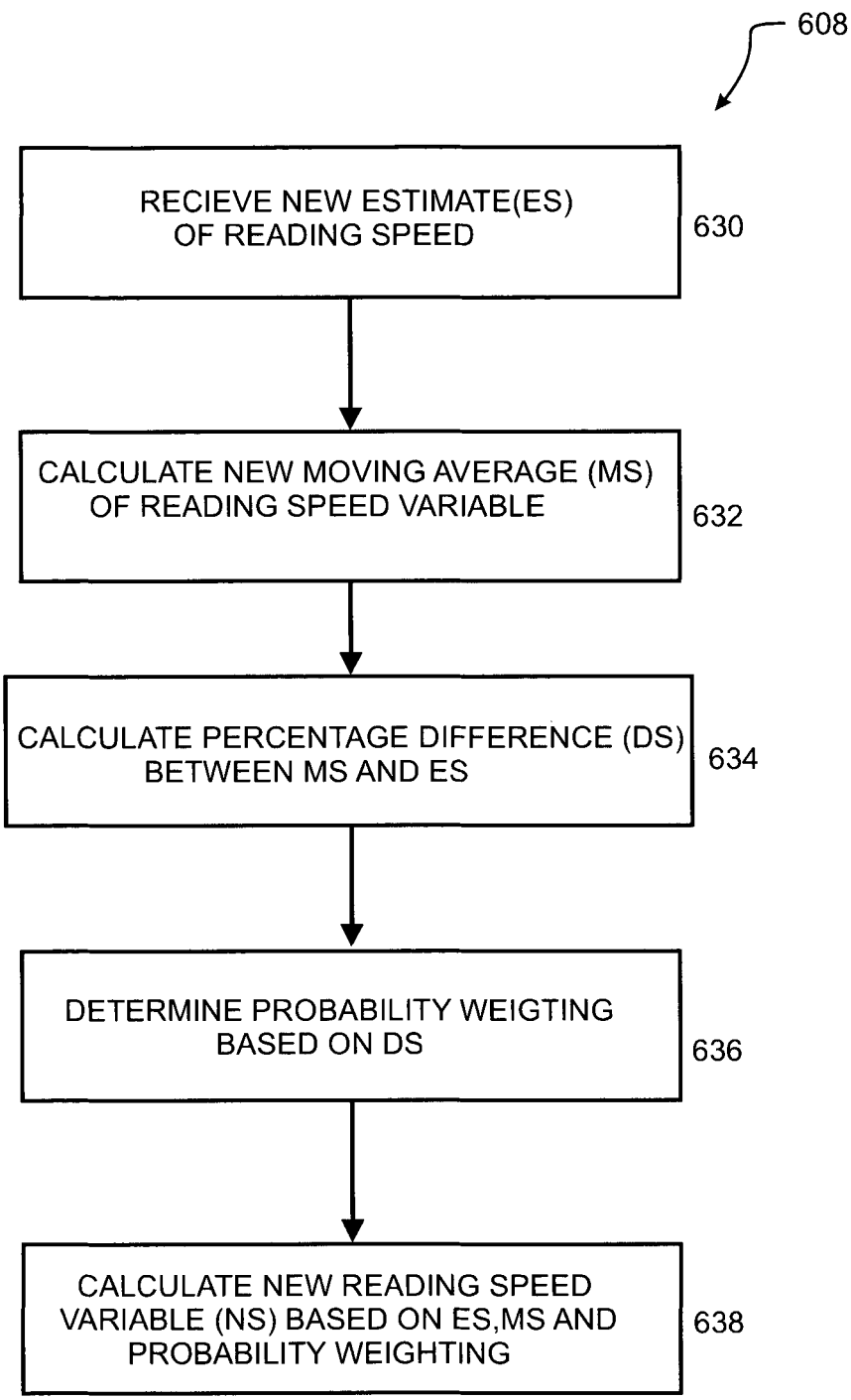
FIG. 24 shows a flow diagram of a method of updating a user reading speed variable based on a new estimate of the user's reading speed within the automatic adjustment method of FIG. 22 in accordance with an embodiment of the invention.

With reference to FIG. 24, one example of an update algorithm 608 will be described by way of example only. The update algorithm retrieves 630 the new estimate of reading speed (ES). A new moving average (MS) of the reading speed variable is then calculated 632 based on a predetermined number of recent reading speed variables. The moving average may be weighted or non-weighted. In this embodiment, the moving average is weighted toward the most recent reading speed variable. By way of example only, the moving average may be calculated as $MS=(NS_1 \times 0.4)+(NS_2 \times 0.3)+(NS_3 \times 0.2)+(NS_4 \times 0.1)$, where $NS_1$ is the most recent reading speed variable, and $NS_4$ is the fourth most recent. It will be appreciated that a non-weighted moving average may alternatively be employed if desired. A difference value indicative of the percentage difference or change (DS) between the new estimate of reading speed ES and the moving average MS is then calculated 634 as $DS=|(MS-ES)/MS|$. A probability weighting for the new estimate of reading speed is then calculated 636 based on a continuous probability distribution. In this example, a normal or Gaussian distribution is employed, although other distributions may alternatively be utilised. The probability weighting (GV) is calculated based on the following probability density function:

$$GV = f(DS) = e^{-\frac{DS^2}{2\sigma^2}} / \sqrt{2\pi\sigma^2}$$

where $\sigma^2$ is the width of the distribution, and may be selected as desired to suit typical reading speed variations. Finally, the new reading speed variable (NS) is calculated 638 based on the new estimated reading speed (ES), the moving average (MS), and the probability weighting as: $NS=MS+(ES-MS) \times GV$.

Reverting to FIG. 22, once the update algorithm processing is complete, the automatic adjustment module is configured to update the user reading speed variable to the value of the new reading speed variable NS. The automatic adjustment module then returns to the initial step 602 of monitoring for a new reading position user input.

In some embodiments, the user reading position input may be configured to correspond to the re-sync input of the playback re-synchronization interface module such that when the user initiates a user reading position input, both the automatic adjustment of the reading speed variable is activated along with the re-synchronisation of the soundtrack with the user selected text position (corresponding to the re-sync text position). Alternatively, the user reading position input and re-sync inputs may be configured to be different types of inputs such that the automatic adjustment module and re-synchronisation interface module can be triggered or activated independently.

Soundtrack Playback Module

The soundtrack playback module 414 is configured to process the audio data from the soundtrack data file 212 and coordinate real-time playback of the audio regions of the soundtrack based on the reading position counter 406 to synchronize playback of the audio regions of the soundtrack with the user's reading of the electronic text.

Overview

The soundtrack playback module 414 controls playback over the audio output system 112, which may have multiple channels that can playback concurrently or which may be mixed together into an output audio signal. In some embodiments, the audio output system may be configured to simply receive, amplify, and output an audio output signal from the soundtrack playback module as audio sound output over connected stereo speakers, headphones, earphones or the like. In such embodiments, the soundtrack playback module is configured to directly load and process the audio track files (digital) from the soundtrack data file or from a linked database or music library, and apply the required audio processing and any playback effects to generate the analogue audio output signal for playback over the audio output system. In other embodiments, the audio output system may be a complete audio controller with sound processor (e.g. DSP) that is configured to load and process the audio track files for the audio regions and generate the required analogue audio output signal for playback over connected speakers, headphones, earphones, or similar, in response to control signals from the soundtrack playback module. In such embodiments, the soundtrack playback module is configured to generate the control signals for controlling the operation of the audio output system to load and playback the audio tracks of the audio regions in a coordinated manner with the required playback effects. The control signals may include, by way of example only and not limited to, control signals for loading audio tracks (e.g. audio files) for playback, adjusting or allocating playback channels, adjusting or controlling equalizer settings, and/or adjusting volume and balance settings in accordance with fade-in, fade-out, or panning envelope configurations and volume envelope configurations as referred to below for example.

Application of Real-Time Playback Effect Data

As mentioned above, the soundtrack playback module is configured to control in real-time the playback effect settings of the audio output system according to any pre-configured playback effect data (e.g. automation envelopes) of an audio region, or this may be controlled by an automation envelope sub-module. If two or more audio regions are playing concurrently on different channels, the soundtrack playback module is configured to independently vary the playback effect settings associated with each channel according to any pre-configured playback effect data defining the audio region playing on each channel. For example, a panning envelope may be applied to a sound effect audio region playing on one channel while a volume envelope is simultaneously being applied to a background music audio region on another channel.

By way of further explanation, the audio data for an audio region may comprise one or more automation envelopes that define one or more respective playback effect settings to be varied across the playback of the audio region in real-time based on the user's real-time text position (which corresponds to a playback position relative to the audio region playback duration). The soundtrack playback module is configured to vary one or more playback effect settings of the audio output system or perform sound manipulation of the audio track of an audio region according to the automation envelope(s) defined in the audio data of that region during the playback duration of the audio region. In one embodiment, the playback effect settings may be modified or updated to match the automation envelope at a frequency corresponding to the reading position counter or the playback effect setting may be updated to match the automation envelope at a higher frequency than the reading position counter. For example, a separate automation envelope update counter may be provided that increments at a frequency higher than that of the reading position counter, and may or may not be based on the user's reading speed variable. As previously described, the automation envelope for an audio region may be stored in the audio data as a programmable function that is dependent on the real-time playback position within the audio region, or a look-up table, by way of example only.

By way of example, the soundtrack playback module may be configured for real-time volume adjustment according to a volume envelope, or real-time balance adjustment according to a panning envelope. The soundtrack playback module may be configured to directly modify the audio track playback properties with audio or sound pre-processing of the audio track and/or via controlling the settings and controls (volume, balance, equalizer etc) of the audio output system via control signals.

Soundtrack Playback Commencement

Playback of the soundtrack may be commenced at any text position within the electronic text, e.g. e-book. The commencement text positions may be automatically selected based on the user's interaction with the e-book and/or selected manually by the user when desired. For example, the user playback system may provide a 'play' or initialization or commencement input or trigger, e.g. play button or the like, that is operable to initiate soundtrack playback based on a commencement text position or playback may be initiated automatically as the user opens the book or turns to a new page. In this embodiment, absent any user manual selection of the commencement text position, the commencement text position automatically defaults to the first word of the current page navigated to by the user. Alternatively, the user may manually select a desired arbitrary commencement text position, such as by using the re-synchronisation input module and providing a re-sync input to indicate a re-sync text position (equivalent in this context to a commencement text position). The soundtrack playback module is configured such that playback of the soundtrack may be commenced at any arbitrary text position within the electronic text, whether that is at the start, end, or part-way through one or more audio regions, or at positions where there are no active audio regions.

The commencement text position corresponds to an index value in the electronic text, e.g. a particular word in the electronic text. The reading position counter is updated to match the commencement text value of the commencement text position once selected. When playback of the soundtrack is initiated for a particular commencement text position, the soundtrack playback module is configured to assess the audio data of the soundtrack for any audio regions that are active in the soundtrack at that commencement text position, i.e. any audio region durations (defined between their respective start index value and stop index value) that encapsulate the commencement index value corresponding to the commencement text position. If there are no active audio regions or if the commencement text position only corresponds to the start or end text positions of one or more audio regions, then the soundtrack playback module is configured to commence playback and cue the audio regions of the soundtrack for playback in a 'normal playback mode' (discussed further below) as the audio regions to be cued will all initiate their associated audio tracks at the default start of the audio track (e.g. time=0 s). If the commencement text position occurs within one or more audio regions, then the soundtrack playback module is configured to commence playback and cue the audio regions of the soundtrack playback module in a 'initialisation playback mode' (discussed further below) as the audio regions to be cued will need to start their associated audio tracks at cue times part-way through the track, rather than at the default start time (e.g. time=0 s) of the audio track, to correspond to the commencement text position occurring part-way through the audio region.

An example of the 'initialisation playback mode' will be described in further detail below. The objective of the initialisation playback mode is to cue the audio tracks of the audio regions to begin at offset cue times part-way into the audio track based on the user's reading speed so that the soundtrack can be accurately commenced at any text position.

The process 600 of calculating the audio track cue time is carried out for each audio region in which the commencement text position occurs within its audio region duration, i.e. part-way through the audio region. By way of example, the process for calculating a cue time will now be explained for a scenario in which the audio region has a duration defined by a start index value of S1=200 (e.g. $200^{th}$ word) and the stop index value is S2=600 (e.g. $600^{th}$ word), the commencement index value (corresponding to the commencement text position) is C=300 (e.g. $300^{th}$ word), and where the reading speed variable is RSV=300 wpm (5 words per second, wps). Firstly, the commencement offset value OV for the commencement index value within the audio region is determined as the difference between the commencement text value and the start index value of the audio region, OV=C−S1, 300−200=100 words, i.e. the commencement text position occurs 100 words from the start of the audio region. Then the cue time CT for the audio track of the audio region is calculated based on the commencement offset value and the reading speed variable, e.g. CT=OV/RSV, $100/300=1/3$ minute=20 seconds. In this scenario, the audio track for the audio region is set to commence or start at an offset cue time of 20 seconds into the track, rather than at the default beginning of the audio track (e.g. time=0 s). In other words, the offset cue time for the audio track of the audio region corresponds to the offset cue time within the audio track relative to the default start time (e.g. time=0 s of the audio track) and this is calculated based on the offset position of the commencement text position from the start of the audio region and the user's reading speed.

Once all the cue times for all active audio regions at the commencement text position are calculated in the initialisation playback mode, the soundtrack playback module is configured to simultaneously trigger playback of the audio tracks of the one or more active audio regions to begin at their respective cue times when playback is activated or initiated. In some cases, one or more of the offset cue times of the audio regions may coincidentally correspond to a position having a peak in the volume of playback, for example as dictated by a volume envelope associated with the audio region or due to the natural volume variation of an audio track. To avoid the user experiencing a sharp and abrupt soundtrack initiation at a loud volume, the initialisation playback mode may be optionally configured to apply a gradual volume fade-in over a preset or configurable time period during commencement of the soundtrack at the commencement text position. After commencement of the soundtrack, and optional fade-in, the soundtrack module is then configured to revert to the 'normal playback mode' for the remainder of the soundtrack. The 'normal playback mode' is discussed further below.

Soundtrack Playback Real-Time Cueing (Normal Playback Mode)

In this embodiment, the soundtrack playback module 414 cues playback of the audio regions in real-time based on the reading position counter. For example, playback of an audio region is initiated when the reading position counter matches the start index value of the audio data for that audio region. Likewise, playback of an audio region is stopped when the reading position counter matches the stop index value of the audio data for that audio region.

The soundtrack playback module continuously or periodically monitors the reading position counter to coordinate and cue playback of the audio regions. As will be appreciated, the soundtrack playback module 414 may coordinate playback of concurrent or overlapping audio regions on multiple different channels. The soundtrack playback module is also configured to modify the playback properties of the audio regions to reflect any playback effect configuration settings of the audio data, such as but not limited to, fade-in and fade-out effects, balance settings in accordance with any panning envelope, and volume envelope settings as set out above. For example, the playback effects of an audio track of an audio region may be modified throughout the audio region to comply with any playback effects that are configured based on the reading position counter. For example, the playback effects may remain constant or vary throughout an audio region depending on the configured audio data. In this embodiment, the reading position counter represents the current word being read and the soundtrack playback module can modify the playback effects of the audio regions to match the user's current text position in real-time in accordance with the pre-configured audio data.

The soundtrack playback module coordinates the playback of the audio regions by continuously and/or periodically searching and analyzing the audio data, for example at each new reading position counter increment or some higher frequency, to assess whether any new audio regions should commence playback, whether playback of any audio regions should cease, or whether the playback effects or audio properties (e.g. volume or balance) should be modified for currently playing audio regions. Based on this analysis, the soundtrack playback module alters and cues playback of the audio regions to accord with the audio data with the timing for synchronisation with the user's reading being provided by the reading position counter.

Looping or Truncation Control

It will be appreciated that the eventual or actual 'playback duration' (time between the start index value and stop index value) of an audio region of the soundtrack is dependent on the user's reading speed variable. For some audio regions, the eventual 'playback duration' may be longer than the natural duration of the audio track of that audio region, and this may occur more often for slower readers. When looping is not configured, silence will occur in relation to that audio region between the end of the audio track and the end of the audio region (when the stop text position is reached). When playback is configured to loop, the audio track will seamlessly loop until the end of the audio region. For other audio regions, the 'playback duration' of the audio region may be shorter than the natural duration of the audio track for that region, and this may occur more often for faster readers. In such situations, the soundtrack playback module halts or truncates the playback of the natural duration of the audio track when the end of the audio region is reached, or may do this in combination with fade-out effects if configured.

As previously mentioned, a 'reading pause' button or input for the user may be provided that can be activated to halt the counter from incrementing. The soundtrack playback module is configured to sense activation of a 'reading pause' input and responds by halting audio playback until the 'reading pause' is deactivated such that the counter is incrementing again, at which point the soundtrack continues playing from where it was paused.

The soundtrack playback module may be provided with an interface for configuring audio or playback settings. For example, FIG. 20 shows an audio settings interface 530 which provides global volume setting sliders 534 for configuring the global volumes for the playback of audio regions having different audio types, such as 'ambient', 'sound effects' and 'music'. This enables a user to selectively and individually modify the playback volume of audio regions having particular audio types. Additionally, the user has the ability to activate or deactivate (i.e. mute) the audio regions for a particular audio type. For example, if the user prefers not to hear ambient audio regions, they may deactivate those sounds using the appropriate on/off buttons shown at 532.

4. Other Alternative Embodiments and Features

Text Indexing

In the embodiment described above, the soundtrack creation and playback system is based on text indexing of the electronic text based on the number of words or characters. For clarity, the above embodiments focus on a word-based indexing approach. However, it will be appreciated that the system may be modified to work on a higher-resolution character-based indexing approach or other text position referencing. For example, the electronic text may be indexed based on the number of individual characters in the electronic text, including letters, symbols, punctuation and the like. For example, each character may be designated an index value representing its character number or character count in the electronic text. Under this indexing scheme, the start and stop index values defining a text region for an audio region correspond to a start character and stop character in the electronic text for the text region. All modules, functions and processes above may be modified to work on a character-based indexing scheme. For example, the reading position counter would represent the index value corresponding to the current estimated character being read by the user. This approach may be useful particularly for non-English symbol based languages as referred to below.

Different Languages

It will be appreciated that the soundtrack creation and playback system may be adapted to suit any language or written text format. The embodiments described above are in relation to English text written and read horizontally from left to right in rows, with rows being ordered top to bottom of the page. However, it will be appreciated that the system may be modified to suit non-English languages, including Japanese text which is written and read in columns from top to bottom, and with the columns ordered left to right on the page. Modification of the system to suit such languages may require the orientation and traverse path of reading position indicators to be modified. Additionally, a character-indexing approach to the text may be required or preferred for some languages.

Adaption of Existing E-Readers

It will be appreciated that the user playback system described above may be adapted to augment existing e-Reader software, devices or systems. A dedicated or integrated user playback system providing both text display and soundtrack playback back is not essential. It will be appreciated that the soundtrack playback module and reading position module may run as a separate application program and communicate or interact with existing or third-party e-Reader systems or application programs, for example via an API, to exchange relevant data to provide the reading experience of text display and a synchronised soundtrack playback above. For example, third-party e-Reader systems may control the text display based on the imported or loaded e-book data file, while the soundtrack playback module and reading position module may coordinate the soundtrack playback with the user's reading speed based on the corresponding soundtrack data file.

Application of Soundtrack to a Portion of Electronic Text

The embodiments above have been described in the context of a soundtrack being configured for an entire electronic text. However, it will be appreciated that the soundtrack may be applied to select parts or portions within an electronic text, and need not be applied to an entire electronic text.

5. Advantages and Benefits

The following advantages may apply to at least some of the embodiments of the system and method described.

The soundtrack creation system and method, and user playback system and method, provide for increased accuracy in synchronising soundtrack playback with the reading speed of a user for electronic text. The system provides for multiple channels of audio to enable concurrent playback of two or more partially or entirely overlapping audio regions such to create an audio output comprising, for example, sound effects, ambience, music or other audio features that are triggered to playback at specific portions in the electronic text to enhance the reading experience. The text indexing approach to configuring the audio regions and triggering their playback with the user's reading speed provides a flexible and robust approach to synchronisation of the audio with the user's reading speed, and the reproduction of desired playback effects. For example, the synchronisation is not affected by font-size changes or page layout formatting, settings which are often modified or customised by the end user when reading an e-book.

The system also provides various unique and user intuitive manual and automatic adjustment options for configuring and/or adjusting and/or calculating the reading speed variable to match the user's reading speed. Additionally, the system enables a reading position indicator to be displayed that is customised to traverse at a rate matched to the end user reading speed.

The system enables seamless soundtrack initiation at any text position in the electronic text, from automatically selected text positions to user-selected arbitrary text positions with offset cue times for audio tracks being automatically calculated and applied for any active audio regions at the commencement text position.

The system allows for automation envelopes of various playback effects to be configured and applied across audio regions, or portions of audio regions, and the application of the envelopes occurs in real-time and is matched to the user's expected reading position in the electronic text. This enables playback effects to be configured for audio regions without knowledge of the end user reading speed.

The foregoing description of the invention includes preferred forms thereof. Modifications may be made thereto without departing from the scope of the invention as defined by the accompanying claims.

The invention claimed is:

1. A method for displaying electronic text and synchronizing the playback of a soundtrack for the electronic text, the soundtrack comprising multiple audio regions configured for playback during corresponding text regions of the electronic text, each audio region being recited in audio data comprises: an audio track for playback in the audio region, a start text position indicative of a word in the electronic text corresponding to where the playback of the audio track is to begin; and a stop text position indicative of a word in the electronic text comprising to where playback of the audio track is to cease, comprising:

displaying at least a portion of the electronic text on an electronic display, the display having an associated operable user interface that is configured to receive user input to enable user interaction with the display;

sensing and tracking a tracing movement of user input relative to the displayed electronic text that is generated by the operable user interface as it is controlled by the user for a tracking period initiated by the user, the tracing movement of the user input representing the user's reading position on the display as the user traces their reading word-by-word or line-by-line on the displayed electronic text using the operable user interface;

generating data indicative of the quantity of text traversed and time taken for the tracing movement;

calculating a measurement of reading speed based on the quantity of text read during the tracing movement and the time taken for the tracing movement;

updating a user reading speed variable representing the user's reading speed based on the calculated measurement of reading speed;

maintaining a reading position counter corresponding to the estimated text position indicative of a word in the electronic text that the user is currently reading, the counter incrementing at a rate based at least partly on the updated user reading speed variable; and controlling playback of the audio regions of the soundtrack over an audio output system based on the audio data and reading position counter to synchronize playback of the audio regions with the user's estimated reading position.

2. A method according to claim 1 wherein sensing and tracking the tracing movement of a user input comprises sensing a start text position in the displayed electronic text at which the user initiates the tracing movement and an end text position in the displayed electronic text at which the user ceases the tracing movement, and generating data indicative of the quantity of the text traversed during the tracing movement comprises determining the number of words or characters between the detected start and end text positions associated with the tracing movement.

3. A method according to claim 2 wherein generating data indicative of the time taken for the tracing movement comprises initiating a timer upon initiation of the tracing movement at the start text position and halting the timer at the end of the tracing movement at the end text position, the output of the timer being indicative of the time taken for the tracing movement.

4. A method according to claim 2 wherein the electronic display is a touch screen display such that the operable user interface is configured to receive user input in the form of touch input upon the surface of the display which generates representative touch signals, and wherein the start text position in the displayed electronic text is detected at initiation of the tracing movement upon sensing user contact with the surface of the display and the end text position is sensed at the position in the displayed electronic text where the user disengages their contact from the surface of the display.

5. A method according to claim 1 wherein sensing and tracking the tracing movement of the user input comprises tracking the user input as it moves substantially horizontally relative to the displayed electronic text word-by-word.

6. A method according to claim 1 wherein sensing and tracking the tracing movement of the user input comprises tracking the user input as it moves substantially vertically relative to the displayed electronic text line-by-line.

7. A method according to claim 1 wherein calculating a measurement of reading speed comprises generating a measurement of reading speed at the end of the tracing movement based on the total quantity of text read and total time taken.

8. A method according to claim 1 wherein calculating a measurement of reading speed comprises continuously or periodically generating a measurement of reading speed in real-time based on quantity of text read since the initiation of the tracing movement and the time elapsed since the initiation of the tracing movement; and continuously or periodically updating the user reading speed variable.

9. A method for displaying electronic text and synchronizing the playback of a soundtrack for the electronic text, the soundtrack comprising multiple audio regions configured for playback during corresponding text regions of the electronic text, each audio region being recited in audio data comprises: an audio track for playback in the audio region, a start text position indicative of a word in the electronic text corresponding to where the playback of the audio track is to begin; and a stop text position indicative of a word in the electronic text comprising to where playback of the audio track is to cease, comprising:

displaying at least a portion of the electronic text on a display;

detecting a first user reading position input indicative of a first reading text position identifying any arbitrary word in a portion of the displayed electronic text the user is reading at the time of the first user reading position input, and generating data indicative of the arbitrary first reading text position;

detecting a second subsequent user reading position input indicative of a second reading text position identifying any arbitrary word in a portion of the displayed electronic text the user is reading at the time of the second user reading position input, and generating data indicative of the arbitrary second reading text position;

calculating the quantity of text read between the arbitrary first and second reading text positions based on their respective generated indicative data;

calculating an estimate of the user's reading speed based on the calculated quantity of text read and the time period between the arbitrary first and second user reading position inputs;

updating a user reading speed variable representing the user's reading speed based on the calculated estimate of the user's reading speed;

maintaining a reading position counter corresponding to the estimated text position indicative of a word in the electronic text that the user is currently reading, the counter incrementing at a rate based at least partly on the updated user reading speed variable; and controlling playback of the audio regions of the soundtrack over an audio output system based on the audio data and reading position counter to synchronize playback of the audio regions with the user's estimated reading position, and wherein the detected arbitrary first and second user reading position inputs are not indicative of page turn events of the displayed electronic text.

10. A method according to claim 9 wherein the electronic text is indexed based on the number of words or characters in the electronic text, and the data indicative of the first reading text position comprises a first index value corresponding to the index value at the first reading text position, and the data indicative of the second reading text position comprises a second index value corresponding to the index value at the second reading text position, and wherein calculating the quantity of text read comprises calculating the absolute difference between the first and second index values.

11. A method according to claim 9 wherein the method further comprises generating a first time stamp and a second time stamp corresponding to the respective times of the first user reading position input and second user reading position input, and calculating the time period between the first and second user reading position inputs based on absolute difference between the first and second time stamps.

12. A method according to claim 9 wherein the method further comprises starting a timer on detection of the first user reading position input and stopping the timer on detection of the second user reading position input, and the output of the timer representing the time period between the first and second user reading position inputs.

13. A method according to claim 9 wherein the display is a touch screen display, and detecting the first and second user reading position inputs comprises sensing user selections of the arbitrary text positions in the displayed electronic text by sensing a user touch input on the surface of the touch screen display at locations corresponding to the arbitrary text positions.

14. A method according to claim 9 wherein detecting the first and second user reading position inputs comprises detecting user selection of the arbitrary text positions in the displayed electronic text by sensing user activation via a user input device of a pointer on the display situated at the location corresponding to the arbitrary text positions.

15. A method according to claim 9 wherein the method further comprises calculating a new estimate of the user's reading speed for each new subsequent user reading position input indicative of the user's current reading text position corresponding to any arbitrary word in the electronic text the user is reading at the time of the new user reading position input, each new estimate of the user's reading speed being calculated based on the quantity of text and time period between the new user reading position input indicative of the user's current arbitrary reading text position and the last user reading position input indicative of the user's previously indicated arbitrary reading text position.

16. A method according to claim 15 wherein the method comprises updating the user reading speed variable by applying an update algorithm for each new calculated estimate of the user's reading speed, the update algorithm comprising:
    calculating a new moving average of the reading speed variable based on a predetermined number of previous reading speed variables;
    calculating a difference value indicative of the percentage change between the new calculated estimate of the user's reading speed and the moving average;
    determining a probability weighting for the new calculated estimate of the user's reading speed based on the difference value and a probability density function; and
    calculating a new reading speed variable based on the new calculated estimate of the user's reading speed, the moving average, and the probability weighting.

17. A method for displaying electronic text and synchronizing the playback of a soundtrack for the electronic text, the soundtrack comprising multiple audio regions configured for playback during corresponding text regions of the electronic text, each audio region being recited in audio data comprises: an audio track for playback in the audio region, a start text position indicative of a word in the electronic text corresponding to where the playback of the audio track is to begin; and a stop text position indicative of a word in the electronic text comprising to where playback of the audio track is to cease, comprising:
    displaying at least a portion of the electronic text on a display;
    displaying a visual moving reading position indicator on the display which identifies the current text position that is estimated as being read based on an initial user reading speed variable representing the user's estimated reading speed, the visual moving reading position indicator moving relative to the text at a rate based on the user reading speed variable representing the user's reading speed;
    providing a user adjustment interface that is operable by a user to increase or decrease the user reading speed variable; and
    updating the user reading speed variable according to any user adjustment to thereby modify the rate of movement of the visual moving reading position indicator to match the updated user reading speed variable,
    wherein the user adjustment interface is operable simultaneously as the electronic text and visual moving reading position indicator are displayed during playback such that the user can view in real-time the effect of any adjustment of the reading speed variable on the rate of movement of the visual moving reading position indicator;
    maintaining a reading position counter corresponding to the estimated text position indicative of a word in the electronic text that the user is currently reading, the counter incrementing at a rate at least partly based on the updated user reading speed variable; and
    controlling playback of the audio regions of the soundtrack over an audio output system based on the audio data and reading position counter to synchronize playback of the audio regions with the user's estimated reading position.

18. A method according to claim 17 wherein the user adjustment interface is in the form of activatable increase and decrease inputs that are configured to respectively increase or decrease the reading speed variable by a predetermined value upon activation by a user.

19. A method according to claim 17 wherein the user adjustment interface is in the form of an operable dial or slider that is moveable to increase or decrease the reading speed variable to a user selected value within a scale of reading speed values defined between upper and lower limits.

20. A method according to claim 17 wherein the visual moving reading position indicator is an inline indicator that is configured to traverse the lines of text word-by-word or character-by-character at a rate that is dependent on the reading speed variable.

21. A method according to claim 17 wherein the visual moving reading position indicator is a margin indicator that is configured to move down the margin of the display text line-by-line at a rate that is dependent on the reading speed variable.

22. A system for displaying electronic text and controlling playback of a soundtrack synchronized to the reading speed of a user comprising:
    an electronic display configured to display the electronic text;
    an operable user interface configured to receive user input to enable user interaction with the system;

an audio output system that is operable to generate audio output for the user to hear;

an electronic text display module configured to process electronic text data representing the electronic text and control display of the electronic text on the display in response to user input from the operable user interface;

a reading position module configured to generate a reading position counter corresponding to the estimated current text position indicative of a word in the electronic text that the user is currently reading, the reading position counter incrementing at a rate based at least partly on a configurable user reading speed variable representing the user's reading speed;

a soundtrack playback module configured to process soundtrack data representing the soundtrack to control playback of the soundtrack over the audio output system, the soundtrack data defining multiple audio regions for the soundtrack, each audio region being recited in audio data comprising:

an audio track for playback in the audio region;

a start text position indicative of a word in the electronic text corresponding to where the playback of the audio region is to begin; and a stop text position indicative of a word in the electronic text corresponding to where the playback of the audio region is to cease;

and wherein the soundtrack playback module is configured to coordinate playback of the audio regions based on the reading position counter to synchronize playback of the audio regions of the soundtrack with the user's reading of the electronic text; and wherein the system further comprises a reading speed adjustment module that is configured to sense and track a tracing movement of user input relative to the displayed electronic text that is generated by the operable user interface as it is controlled by the user for a tracking period initiated by the user, and which calculates and updates the user reading speed variable based on the quantity of text traversed during the tracing movement and the time taken for the tracing movement, the tracing movement of the user input representing the user's reading position on the display as the user traces their reading word-by-word or line-by-line of the displayed electronic text using the operable user interface.

23. A system according to claim 22 wherein the reading speed adjustment module is configured to sense and track the tracing movement of the user input by sensing a start text position in the displayed electronic text at which the user initiates the tracing movement and an end text position in the displayed electronic text at which the user ceases the tracing movement, and generating data indicative of the quantity of the text traversed during the tracing movement comprises determining the number of words or characters between the detected start and end text positions associated with the tracing movement.

24. A system according to claim 23 wherein the reading speed adjustment module is configured to generate data indicative of the time taken for the tracing movement by initiating a timer upon initiation of the tracing movement at the start text position and halting the timer at the end of the tracing movement at the end text position, the output of the timer being indicative of the time taken for the tracing movement.

25. A system according to claim 23 wherein the electronic display is a touch screen display such that the operable user interface is configured to receive user input in the form of touch input upon the surface of the display which generates representative touch signals, and wherein the start text position in the displayed electronic text is detected at initiation of the tracing movement upon sensing user contact with the surface of the display and the end text position is sensed at the position in the displayed electronic text where the user disengages their contact from the surface of the display.

26. A system according to claim 22 wherein the reading speed adjustment module is configured to sense and track the tracing movement of the user input by tracking the user input as it moves substantially horizontally relative to the displayed electronic text word-by-word.

27. A system according to claim 22 wherein the reading speed adjustment module is configured to sense and track the tracing movement of the user input by tracking the user input as it moves substantially vertically relative to the displayed electronic text line-by-line.

28. A system according to claim 22 wherein the reading speed adjustment module is configured to calculate a measurement of reading speed by generating a measurement of reading speed at the end of the tracing movement based on the total quantity of text read and total time taken.

29. A system according to claim 22 wherein the reading speed adjustment module is configured to calculate a measurement of reading speed by continuously or periodically generating a measurement of reading speed in real-time based on quantity of text read since the initiation of the tracing movement and the time elapsed since the initiation of the tracing movement; and continuously or periodically updating the user reading speed variable.

30. A system for displaying electronic text and controlling playback of a soundtrack synchronized to the reading speed of a user comprising:

an electronic display configured to display the electronic text;

a user interface configured to receive user input to control the system;

an audio output system that is operable to generate audio output for the user to hear;

an electronic text display module configured to process electronic text data representing the electronic text and control display of the electronic text on the display in response to user input from the user interface;

a reading position module configured to generate a reading position counter corresponding to the estimated current text position indicative of a word in the electronic text that the user is currently reading, the reading position counter incrementing at a rate based at least partly on a configurable user reading speed variable representing the user's reading speed;

a soundtrack playback module configured to process soundtrack data representing the soundtrack to control playback of the soundtrack over the audio output system, the soundtrack data defining multiple audio regions for the soundtrack, each audio region being recited in audio data comprising:

an audio track for playback in the audio region;

a start text position indicative of a word in the electronic text corresponding to where the playback of the audio region is to begin; and a stop text position indicative of a word in the electronic text corresponding to where the playback of the audio region is to cease;

and wherein the soundtrack playback module is configured to coordinate playback of the audio regions based on the reading position counter to synchronize playback of the audio regions of the soundtrack with the user's reading of the electronic text; and the system further comprising a reading speed adjustment module that is configured to:
- detect a first user reading position input indicative of a first reading text position identifying any arbitrary word in a portion of the displayed electronic text the user is reading at the time of the first user reading position input, and generate data indicative of the arbitrary first reading text position;
- detect a second subsequent user reading position input indicative of a second reading text position identifying any arbitrary word in a portion of the displayed electronic text the user is reading at the time of the second user reading position input, and generate data indicative of the arbitrary second reading text position;
- calculate the quantity of text read between the arbitrary first and second reading text positions based on their respective generated indicative data;
- calculate an estimate of the user's reading speed based on the calculated quantity of text read and time period between the arbitrary first and second user reading position inputs; and
- update the configurable user reading speed variable based on the calculated estimate of the user's reading speed, and wherein the detected arbitrary first and second user reading position inputs are not indicative of page turn events of the displayed electronic text.

31. A system according to claim 30 wherein the electronic text is indexed based on the number of words or characters in the electronic text, and the data indicative of the first reading text position comprises a first index value corresponding to the index value at the first reading text position, and the data indicative of the second reading text position comprises a second index value corresponding to the index value at the second reading text position, and wherein calculating the quantity of text read comprises calculating the absolute difference between the first and second index values.

32. A system according to claim 30 wherein the reading speed adjustment module is further configured to generate a first time stamp and a second time stamp corresponding to the respective times of the first user reading position input and second user reading position input, and calculating the time period between the first and second user reading position inputs based on absolute difference between the first and second time stamps.

33. A system according to claim 30 wherein the reading speed adjustment module is further configured to start a timer on detection of the first user reading position input and stop the timer on detection of the second user reading position input, and the output of the timer representing the time period between the first and second reading position user inputs.

34. A system according to claim 30 wherein the electronic display is a touch screen display, and wherein the reading speed adjustment module is configured to detect the first and second user reading position inputs by sensing user selections of the arbitrary text positions in the displayed electronic text by sensing a user touch input on the surface of the touch screen display at locations corresponding to the arbitrary text positions.

35. A system according to claim 30 wherein the reading speed adjustment module is configured to detect the first and second user reading position inputs by detecting user selection of the arbitrary text positions in the displayed electronic text by sensing user activation via a user input device of a pointer on the display situated at the location corresponding to the arbitrary text positions.

36. A system according to claim 30 wherein the reading speed adjustment module is further configured to calculate a new estimate of the user's reading speed for each new subsequent user reading position input indicative of the user's current reading text position corresponding to any arbitrary word in the electronic text the user is reading at the time of the new user reading position input, each new estimate of the user's reading speed being calculated based on the quantity of text and time period between the new user reading position input indicative of the user's current arbitrary reading text position and the last user reading position input indicative of the user's previously indicated arbitrary reading text position.

37. A system according to claim 36 wherein the reading speed adjustment module is further configured to update the configurable user reading speed variable by applying an update algorithm for each new calculated estimate of the user's reading speed, the update algorithm comprising:
- calculating a new moving average of the reading speed variable based on a predetermined number of previous reading speed variables;
- calculating a difference value indicative of the percentage change between the new calculated estimate of the user's reading speed and the moving average;
- determining a probability weighting for the new calculated estimate of the user's reading speed based on the difference value and a probability density function; and
- calculating a new reading speed variable based on the new calculated estimate of the user's reading speed, the moving average, and the probability weighting.

38. A system for displaying electronic text and controlling playback of a soundtrack synchronized to the reading speed of a user comprising:
- an electronic display configured to display the electronic text;
- a user interface configured to receive user input to control the system;
- an audio output system that is operable to generate audio output for the user to hear;
- an electronic text display module configured to process electronic text data representing the electronic text and control display of the electronic text on the display in response to user input from the user interface;
- a reading position module configured to generate a reading position counter corresponding to the estimated current text position indicative of a word in the electronic text that the user is currently reading, the reading position counter incrementing at a rate based at least partly on a configurable user reading speed variable representing the user's reading speed;
- a soundtrack playback module configured to process soundtrack data representing the soundtrack to control playback of the soundtrack over the audio output system, the soundtrack data defining multiple audio regions for the soundtrack, each audio region being recited in audio data comprising:
  - an audio track for playback in the audio region;
  - a start text position indicative of a word in the electronic text corresponding to where the playback of the audio region is to begin; and a stop text position indicative of a word in the electronic text corresponding to where the playback of the audio region is to cease;

and wherein the soundtrack playback module is configured to coordinate playback of the audio regions based on the reading position counter to synchronize playback of the audio regions of the soundtrack with the user's reading of the electronic text; and the system further comprising a reading speed adjustment module that is configured to:

display a visual moving reading position indicator on the display which identifies the estimated current text position that is estimated as being read based on the reading position counter, the visual moving reading position indicator moving relative to the text at a rate based on the user reading speed variable representing the user's reading speed;

provide a user adjustment interface that is operable by a user to increase or decrease the configurable user reading speed variable; and update the user reading speed variable according to any user adjustment to thereby modify the rate of movement of the visual moving reading position indicator to match the updated user reading speed variable, and wherein the user adjustment interface is operable simultaneously as the electronic text and visual moving reading position indicator are displayed during playback such that the user can view in real-time the effect of any adjustment of the user reading speed variable on the rate of movement of the visual moving reading position indicator.

39. A system according to claim 38 wherein the user adjustment interface is in the form of activatable increase and decrease inputs that are configured to respectively increase or decrease the reading speed variable by a predetermined value upon activation by a user.

40. A system according to claim 38 wherein the user adjustment interface is in the form of an operable dial or slider that is moveable to increase or decrease the reading speed variable to a user selected value within a scale of reading speed values defined between upper and lower limits.

41. A system according to claim 38 wherein the visual moving reading position indicator is an inline indicator that is configured to traverse the lines of text word-by-word or character-by-character at a rate that is dependent on the reading speed variable.

42. A system according to claim 38 wherein the visual moving reading position indicator is a margin indicator that is configured to move down the margin of the display text line-by-line at a rate that is dependent on the reading speed variable.

* * * * *